(12) United States Patent
Seyboth

(10) Patent No.: US 11,992,795 B2
(45) Date of Patent: May 28, 2024

(54) FILTER STRUCTURE BODY AND FILTER MODULE FOR SEPARATING IMPURITIES FROM A RAW FLUID STREAM

(71) Applicant: DÜRR SYSTEMS AG, Bietigheim-Bissingen (DE)

(72) Inventor: Oliver Seyboth, Hemmingen (DE)

(73) Assignee: DURR SYSTEMS AG, Bietigheim-Bissingen (DE)

( * ) Notice: Subject to any disclaimer, the term of this patent is extended or adjusted under 35 U.S.C. 154(b) by 654 days.

(21) Appl. No.: 17/266,576

(22) PCT Filed: Aug. 9, 2019

(86) PCT No.: PCT/DE2019/100721
§ 371 (c)(1),
(2) Date: Feb. 6, 2021

(87) PCT Pub. No.: WO2020/035108
PCT Pub. Date: Feb. 20, 2020

(65) Prior Publication Data
US 2021/0291098 A1    Sep. 23, 2021

(30) Foreign Application Priority Data
Aug. 14, 2018 (DE) ..................... 10 2018 119 684.9

(51) Int. Cl.
*B01D 46/00* (2022.01)
*B01D 46/52* (2006.01)

(52) U.S. Cl.
CPC ....... *B01D 46/0005* (2013.01); *B01D 46/523* (2013.01); *B01D 2265/06* (2013.01)

(58) Field of Classification Search
CPC .............. B01D 46/0005; B01D 46/523; B01D 2265/06; B01D 46/10
See application file for complete search history.

(56) References Cited

U.S. PATENT DOCUMENTS

| 3,222,850 A | 12/1965 | Hart |
| 4,177,050 A | 12/1979 | Culbert et al. |

(Continued)

FOREIGN PATENT DOCUMENTS

| DE | 19816238 A1 | 10/1999 |
| DE | 102013218219 A1 | 3/2015 |

(Continued)

OTHER PUBLICATIONS

International Search Report (Jan. 8, 2020) for corresponding International App. PCT/DE2019/100721.

(Continued)

*Primary Examiner* — Christopher P Jones
*Assistant Examiner* — Phillip Y Shao
(74) *Attorney, Agent, or Firm* — WRB-IP PLLC

(57) ABSTRACT

A filter module for separating impurities from a raw gas stream containing impurities includes at least one three-dimensional filter structure body, through which the raw gas stream can be conducted, and an outer frame for receiving the filter structure body between a raw-side opening and a clean-side opening. The three-dimensional filter structure body includes at least one support structure and a filter layer arranged thereon. The support structure has at least one comb-like segment with a base, from which prongs, which are spaced apart from one another, project jointly in a direction in the longitudinal direction of the base. A laying direction of the filter layer extends in the longitudinal direction of the base. A filter structure body, a kit, and a method for producing a filter structure body are also provided.

11 Claims, 14 Drawing Sheets

(56) References Cited

U.S. PATENT DOCUMENTS

| | | | |
|---|---|---|---|
| 4,363,643 A | | 12/1982 | Elbrader et al. |
| 5,611,830 A | * | 3/1997 | Ernst ................. B01D 46/0005 |
| | | | 55/378 |
| 5,840,094 A | * | 11/1998 | Osendorf ........... B01D 46/0001 |
| | | | 65/27 |
| 6,074,450 A | | 6/2000 | Raber |
| 6,833,022 B2 | * | 12/2004 | Feisthammel ......... B01D 45/06 |
| | | | 96/138 |
| 2003/0070406 A1 | | 4/2003 | Duffy |
| 2005/0028498 A1 | * | 2/2005 | Entezarian ............. B01D 50/20 |
| | | | 55/467 |
| 2005/0039427 A1 | | 2/2005 | Karlsson |
| 2010/0236204 A1 | | 9/2010 | Bouhanna et al. |
| 2011/0214565 A1 | * | 9/2011 | Kwok ................... B01D 45/08 |
| | | | 95/267 |
| 2014/0230388 A1 | | 8/2014 | Hio et al. |

FOREIGN PATENT DOCUMENTS

| | | |
|---|---|---|
| DE | 102015202257 A1 | 8/2016 |
| DE | 102015112113 A1 | 1/2017 |
| DE | 102016001889 A1 | 8/2017 |
| JP | H09287811 A | 11/1997 |

OTHER PUBLICATIONS

German Search Report (Feb. 5, 2019) for corresponding German Official Action 10 2018 119 684.9.

* cited by examiner

FILTER STRUCTURE BODY AND FILTER MODULE FOR SEPARATING IMPURITIES FROM A RAW FLUID STREAM

BACKGROUND AND SUMMARY

The invention relates to a filter structure body for a filter module for separating impurities from a raw gas stream containing impurities, particularly for use in a paint system for painting workpieces, particularly vehicle bodies, and a filter module having a filter structure body and a method for producing a filter structure body.

DE 102011050915 A1 discloses a paper core filter module having an outer frame and a three-dimensional paper core filter disposed therein, with spacers disposed between individual sections of the three-dimensional paper core filter. The use of the paper core filter increases the effective area of the filter module or a paint mist separating module.

Furthermore, a paper core filter module is disclosed having an outer frame and a three-dimensional paper core filter in the form of a multiply folded sheet disposed therein. The paper core filter is attached to the frame at turning points of the multiply folded sheet, the so-called noses. This embodiment as well achieves an increase in the effective area of the filter module by using a paper core filter.

No spacers are required to ensure a spacing between the sides of the multiply folded paper core filter sheet, instead, such a spacing is achieved by fastening the paper filter core sheet in the region of the noses resulting from folding at regular intervals to the frame, using appropriate fastening means.

One problem of the invention is to create a filter module which is easier to produce and can be transported in a space-saving manner.

Another problem of the invention is the provision of a filter structure body for such a filter module.

Another problem of the invention is the provision of a method for producing a filter structure body for such a filter module.

According to one aspect of the invention, a filter module for separating impurities from a raw fluid stream containing impurities is proposed, comprising a three-dimensional filter structure body through which the raw fluid stream can be conducted and an outer frame for receiving the filter structure body between a raw gas-side opening and a clean gas-side opening. The three-dimensional filter structure body comprises a support structure and a filter sheet disposed thereon, which sheet comprises an inflow surface and an outflow surface. The support structure comprises at least one comb-like shaped segment with a base, from which base prongs project in a joint direction at a spacing from each other. A laying direction of the filter sheet extends in the longitudinal direction of the base.

Inflow regions of the inflow surface are disposed on one side of the filter sheet, and outflow regions of the outflow surface are disposed on the opposite side of the filter sheet. The inflow regions or outflow regions each extend along outer edges of the prongs between the base and the ends of the prongs remote from the base.

The support structure is preferably disposed on one side of the filter sheet only. The support structure can for example be disposed on the inflow side of the filter sheet. The comb-like design of the particularly flat segments of the support structure can prevent that parts of the filter sheet are covered and the permeable inflow and outflow surfaces are decreased.

Advantageously, such a filter module can be used in industrial painting and/or in car body painting.

The support structure can advantageously be constructed as a dimensionally stable framework. To this end, comb-like segments can be disposed parallel to each other and congruently and be connected using connecting elements oriented orthogonally to these segments. The framework allows the formation of a three-dimensional negative contour of the corrugated shape intended for the filter sheet by support surfaces at certain points or along certain lines into which contour the filter sheet can simply be inserted. This improves the stability of the filter structure body. Even at a high load of the filter module, collapsing of the filter sheet and resulting leakages within the filter module can be prevented.

Due to the comb-like structure of the segments, the filter sheet can advantageously have a corrugated shape along the segments. Preferably, the segments can be provided at equidistant intervals.

The comb-like segment of the support structure can advantageously be designed by perforations in the surface, such that the separated paint can flow downwards inside the filter if the holding device is oriented such that the corrugations extend vertically. When the holding device is oriented such that the corrugations extend horizontally, a horizontal flow of air can pass through the corrugation interstice.

The stable, frame-like support structure can prevent a reduction in capacity of the filter module. Raw gas-side bulging of the filter sheet and decreasing of inflow lanes can be prevented. Decreasing the inflow lanes could result in undesirable early clogging of the filter sheet, for example with paint particles.

Any desired filter sheets can be held in corrugated form and fastened in the three-dimensional filter structure body of the filter module. The filter sheet is inserted in the three-dimensional shape-forming support structure. The filter sheet can be fastened on the support structure by means of a fixing structure, for example, clamping wedges. The filter structure body can be used both with a vertical and horizontal orientation of the waves. Angular orientations in between are also conceivable.

Favorable is a cuboid frame for receiving the filter structure body, which frame has a raw gas-side inflow opening and a clean gas-side outflow opening on the opposite side. The frame can advantageously be formed of corrugated cardboard.

The filter sheet can expediently just be placed upon the support structure. The filter sheet can for example be connected to the support structure by means of clamping forces.

Advantageously, the filter sheet can be disposed, preferably clamped, between the support structure and the fixing structure.

Fixing elements in the form of clamping wedges can be rounded on their narrow sides to allow easy inserting into the corrugation interstices and to minimize the risk of damaging the filter sheet. Fixing elements of different widths can be used for filter sheets of different thicknesses to ensure safe clamping of the filter sheets.

The clamping wedges of the fixing structure can also be structured like a framework and dimensioned such that they can be moved into the free corrugation valleys and press the filter sheet at certain points or linearly against the support structure. The clamping wedges can be congruent and parallel and connected by connecting elements. The clamping wedges can for example have a trapezoid or triangular shape and preferably match the shape of the free cross sectional surface of the interstices of the inserted filter sheet.

The filter structure body allows reliable sealing between filter sheet or support structure and the frame.

The flow-through direction of the filter structure body is preferably selected such that the support structure is on the raw gas side upstream of the filter sheet, while the fixing structure is on the clean gas side. The arrangement of the connecting elements described results in the advantage that the connecting elements are not positioned in the inflow opening into the corrugation interstices but centrally in front of the end faces (corrugation peaks). This results in a favorable guidance of the flow into the corrugation interstices and at the same time prevents premature clogging of the inflow openings by paint adhering to the connecting elements. Furthermore, the connecting elements provide stripping surfaces for the paint upstream of the filter sheet, which additionally increases service life.

When the support structure is disposed on the raw gas side, it may be advantageous if the connecting elements extending in front of the corrugations of the filter sheet are shaped such that they serve as a guiding element to cause improved flow guidance into the corrugation interstices. It can be particularly advantageous if the connecting elements that serve as guiding elements completely cover the corrugation peaks when viewed from the inflow direction and decrease the inflow cross sections into the corrugation interstices, such that acceleration of the entering fluid stream, particularly air stream, increases.

Due to this acceleration, the air with the paint particles contained therein penetrates deeper into the corrugation interstice, charging it with paint against the flow direction from the back to the front, thereby increasing the capacity of the filter module.

Advantageously, the support structure can be composed of multiple comb-like segments which are positioned parallel to each other. Advantageously, the support structure can be formed of joined elements. This makes assembly of the filter module and the filter structure body easier.

The filter sheet can for example be formed of a slotted paper sheet. In addition to paper, polyester fleece or glass fiber material can be used. Other non-woven filter materials, filter fabrics, or mats made of other filter materials such as coconut fiber can optionally be used.

The filter sheet can be single-layer. Alternatively, the filter sheet can be multi-layer. For example, a coarser layer, such as slotted paper, can be followed by a finer layer, such as a non-woven mat, for example made of polyester. The coarser layer can have a high storage capacity, while the finer layer can have a smaller storage volume than the former.

Expediently, the filter sheet can be configured as a flexurally soft mat. The filter sheet can then for example stored as rollable material. If the filter sheet has multiple layers, the various layers of the filter sheet can optionally be inserted one after the other into the support structure. It is not necessary to connect the multiple layers of the filter sheet prior to installation in the support structure. This simplifies the assembly of the filter module and saves costs.

Alternatively, the various layers of the filter sheet can be loosely placed on top of each other, inserted into the support structure, and fastened.

Optionally, the layers can be connected prior to being inserted into the support structure, which saves aligning of the individual layers.

If the filter sheet is placed onto the at least one comb-like segment of the support structure, the filter sheet can for example extend in a corrugated shape along the base of the support structure. A corrugation end can be disposed at the base and a next corrugation end can be disposed at the end of a prong remote from the base.

Multiple filter structure bodies can be disposed one after the other or next to each other in a joint frame.

The use of multiple filter structure bodies, each in its own frame, one after the other may also be advantageous. Using different filter layers can help separate coarse and fine separation.

This allows replacement of charged filter stages separately from each other. Using various coarse and various fine filter layers also yields a multitude of combination options, such that the filter combination can be adjusted to different paints and painting processes.

According to a favorable embodiment of the filter module, the filter sheet can be fastened in the support structure by means of a fixing structure which comprises at least one fixing element. The fixing element can advantageously be inserted on the side of the filter sheet opposite the support structure. If the filter sheet is configured in a corrugated shape along the base, the fixing element can be part of a fixing structure with multiple fixing elements. A clamping wedge having an at least approximately trapezoid or triangular shape is advantageous as a fixing element.

Advantageously, the support structure and the fixing structure interact, wherein the fixing structure engages in free spaces of the support structure and the fixing structure engages in free spaces of the support structure, the filter sheet being disposed between the support structure and the fixing structure. This allows stable fastening of the filter sheet onto the support structure.

Elements of the support structure and/or the fixing structure can favorably be configured as flat parts.

According to a favorable embodiment of the filter module, the base can be configured in one piece. The base can be configured in the manner of a strip. Optionally, the base can be composed of individual base segments which are held together by connecting elements and/or the filter sheet.

According to a favorable embodiment of the filter module, the prongs can taper in a direction away from the base. This makes it easier to insert the filter sheet into interstices of neighboring prongs.

Furthermore, the spacing between the corrugation peaks on the raw gas side can be wider than on the clean gas side of the filter module. This extends the service life, since these "inflow lanes" on the raw gas side are successively clogged by paint.

According to a favorable embodiment of the filter module, the filter sheet can comprise a filter mat, which can particularly be a flexurally soft filter mat. Advantageously, the filter sheet may have sufficient inherent stability, such that it is soft enough to allow trouble-free insertion of the filter sheet in the interstices of the prongs, but stably opens up the inflow regions of the inflow surface when inserted in the support structure.

According to a favorable embodiment of the filter module, the filter structure body can be fastened in the outer frame without any connecting means. Particularly, the filter structure body can be substantially form-fitted into the outer frame.

According to a favorable embodiment of the filter module, the filter sheet can be placed in a corrugated manner along the base of the at least one segment of the support structure. This allows a favorable configuration of the filter structure body during the interaction of the support structure and the fixing structure. Optionally, the start and end of the filter sheet can slightly protrude beyond the support structure. The protrusion can advantageously be used for sealing the filter structure body relative to the frame. Optionally, the longitudinal sides of the filter sheet may also protrude beyond the support structure. This improves the sealing of the filter structure body against the surrounding frame.

According to a favorable embodiment, a coarse separator followed by a fine filtering stage can be disposed in the frame. The fine filtering stage is formed of a filter structure body according to the invention. The coarse separator can particularly be provided for inertial separation of components contained in a flowing-through fluid, particularly paint particles and/or paint agglomerates. Particularly, the coarse separator can have at least one acceleration section for the fluid on the inlet side, in which the fluid is accelerated in a flow direction, while the acceleration section is followed by a stripping surface for components contained in the fluid.

According to a favorable embodiment, an extension of the acceleration section between the bottom part and cover part of the coarse separator can particularly be oriented perpendicular to the corrugations of the filter sheet of the fine filtering stage. This orientation of the corrugations allows a horizontal flow in the corrugation interstices of the filter sheet. If the coarse separator were tilted about the x axis, for example, it would be advantageous to maintain the relative orientation of the corrugations of the filter sheet of the fine filtering stage transversely to the extension of the acceleration section.

According to another aspect of the invention, a filter structure body for a filter module according to the invention is proposed for separating impurities from a raw fluid stream containing impurities. The filter structure body comprises a support structure and a filter sheet disposed thereon, which sheet comprises an inflow surface and an outflow surface. The support structure comprises at least one comb-like shaped segment with a base, from which base prongs project jointly at a spacing from each other in the longitudinal direction of the base, wherein a laying direction of the filter sheet extends in the longitudinal direction of the base.

Inflow regions of the inflow surface are disposed on one side of the filter sheet, and outflow regions of the outflow surface are disposed on the opposite side of the filter sheet, each of which extending along the prongs between the base and ends of the prongs remote from the base.

The filter structure body can for example be used as fine filtering stage, for example having a fine filtering mat of polyester or glass fiber material as a filter sheet. The fine filtering stage can be used as post-filter following a coarse separator, which for example operates according to the inertia principle.

Alternatively, the filter structure body can be used as a combined separator in which a multi-layer filter sheet is used, for example including a coarse filtering mat as pre-filtration mat upstream of the fine filtering mat for pre-filtration. Particularly, multi-layer filtering mats made of slotted paper sheets can be used as pre-filtration mats. An advantage here is that high storage capacity can be combined with very good fine filtering, particularly high separation efficiency.

Alternatively, a similar advantage can be achieved in that (only) one filter sheet from a fine filtering mat is used which has a three-dimensional surface on the inflow side to increase its storage volume. In this manner, a larger surface for depositing the separated paint is available, and the filter sheet will not clog that fast. This variant can pose other advantages, such as lower material costs, less assembly effort for the filter module because only one filter sheet must be inserted, increased separation efficiency and storage capacity in specific applications, particularly if paint particles are relatively dry.

The filter sheet can also be formed of multiple layers, of which at least one layer on the raw gas side has a three-dimensional structure as described above.

If the filter structure body is used in a joint frame downstream of a coarse separator, the support structure can be connected to the coarse separator structure or be part of the coarse separator structure.

An advantageous coarse separator can have at least one separation segment comprising at least one acceleration section for the fluid on the inlet side of the coarse separator, in which the fluid is accelerated in a flow direction, wherein the acceleration section is followed by a first stripping surface for components contained in the fluid.

The first stripping surface can have an impact area and a curved section following in the flow direction for deflecting the fluid by at least 45°, preferably by at least 180°, from the flow direction of the fluid in the acceleration section.

Particularly, the first stripping surface can be continuous along the curved section.

In the separating stage, a flow-optimized geometrical structure for inertial separation, particularly the geometrical structure of a favorable mace-like flow path that is passed through. A free flow cross section as large as possible can be provided along a stripping surface which can be expected to have substantial paint deposits. Despite the typical inherent trade-off between high separation efficiency and low pressure loss, a flow-optimized separation structure can offer a separation efficiency as high as possible and a pressure loss as low as possible. The stripping surface is preferably disposed with an impact area transversely to the outlet of the acceleration section.

Likewise, a suitable and customized shaping and arrangement of acceleration section and stripping surface can optionally provide high storage capacity for separated paint. This is equivalent with a just minor increase in flow-through resistance of the separation stage due to increasing paint accumulation.

Particularly, the separation stage can be assigned an x-axis, a y-axis, and a z-axis, which are perpendicular to each other.

The main flow direction of the fluid in the acceleration section can be viewed as an imaginary straight connection between the inlet side and the outlet side of the acceleration section, wherein the flow enters the accelerations section on the inlet side and exits it on the outlet side, which is opposite the inlet side, regardless of whether the flow reverses directions once or multiple times inside the acceleration section.

The x-axis corresponds to the main flow direction.

The free flow cross section at the entry of the fluid into the acceleration section is disposed along the y-axis between flow surfaces of the separation stage.

For example, the x-axis can correspond to a longitudinal axis of an acceleration section, the z-axis to a vertical axis, and the y-axis to a transverse axis.

Favorably, the acceleration section is configured as a nozzle with a large flow cross section at the entry of the fluid into the acceleration section, which cross section tapers in the flow direction. The free flow cross section at the entry of the fluid into the acceleration section is parallel to the y-axis and the z-axis.

According to a favorable embodiment of the filter structure body, the filter sheet can be fastened in the support structure by means of a fixing structure which comprises at least one fixing element. The fixing element can advantageously be inserted on the side of the filter sheet opposite the support structure. If the filter sheet is configured in a corrugated shape along the base, the fixing element can be part of a fixing structure with multiple fixing elements.

Advantageously, the support structure and the fixing structure interact, wherein the fixing structure engages in free spaces of the support structure and the fixing structure engages in free spaces of the support structure, the filter sheet being disposed between the support structure and the fixing structure. This allows stable fastening of the filter sheet onto the support structure.

Elements of the support structure and/or the fixing structure can favorably be configured as flat parts.

According to a favorable embodiment of the filter structure body, the base can be configured in one piece. The base can be configured in the manner of a strip. Optionally, the base can be composed of individual base segments which are held together by connecting elements and/or the filter sheet.

According to a favorable embodiment of the filter structure body, the prongs can taper in a direction away from the base. This makes it easier to insert the filter sheet into interstices of neighboring prongs.

According to a favorable embodiment of the filter structure body, the support structure can contact the filter sheet substantially linearly compared to an extension of the filter sheet in the flow cross section. The cross section of the filter sheet through which the fluid flows remains substantially uninfluenced by the support structure. Optionally, the fixing structure can be designed such that the fixing structure can contact the filter sheet substantially linearly with respect to an extension of the filter sheet in the flow cross section. The cross section of the filter sheet through which the fluid flows remains virtually uninfluenced by the fixing structure.

According to a favorable embodiment of the filter structure body, the start and end of the filter sheet can slightly protrude beyond the support structure. The protrusion can advantageously be used for sealing the filter structure body relative to the frame. Optionally, the longitudinal sides of the filter sheet may also protrude beyond the support structure. This improves the sealing of the filter structure body against the surrounding frame.

According to another aspect of the invention, a kit for producing a filter structure body according to the invention for a filter module according to the invention is proposed for separating impurities from a raw fluid stream containing impurities. The filter structure body has a support structure, wherein the support structure can be composed of components which can be taken from a pre-cut and/or pre-punched template, particularly a pre-cut and/or pre-punched template of cardboard and/or corrugated cardboard and/or fiber moldings and/or deep-drawn parts made of plastic.

It is advantageously possible to build the filter structure body with a few steps. The filter structure body can be transported in a space and cost-saving manner as a template and built on site. The filter sheet can be transported likewise in a space and cost-saving manner as a mat.

The components for the support structure and fixing structure as punched parts, particularly punched parts of corrugated cardboard, can be produced at low cost everywhere in the world. Compared to other filter designs, these components require very small amounts of raw material. The assembly of support structure and fixing structure and the insertion of the filter sheet are very simple and can be advantageously performed at the site of use.

The filter structure body can be used for any desired filtration processes.

Particularly the support structure made of corrugated cardboard is, based on the material properties, primarily suited for separating solid or viscous particles from gas streams.

The application is advantageous for separating paint mist from coating processes, particularly liquid coating. Various painting processes from minor manual spray stands in general industries to fully automated systems for large series spray-painting in the automotive sector. Particularly, a use in separation systems can be envisaged in which the filter modules are connected to the spray booth in movable trolleys to allow filter replacement during running spray-painting operations.

Assembly of the components is intuitive and can be done in a short time. Assembly is made particularly simple in that the dimensionally stable support structure is at the same time used as an assembly aid.

According to a favorable embodiment, a filter structure body assembly device and a frame assembly device for inserting the filter structure body into the frame can be used for assembly. The parts of the support structure can be inserted in the assembly device to hold them in position.

The frame assembly device allows precise positioning of the filter structure body in the frame.

The components of the filter structure body have a very small transport volume, since these are flat punched parts which can be stacked in a space-saving manner. The filter sheets to be inserted in the support structure can be delivered separately or as rollable material, which also saves space. The required storage areas are accordingly small.

According to a favorable embodiment of the kit, components for one or more fixing elements can be included in the template. These can be pre-punched or pre-cut and separated from the template to build the filter structure body.

The kit for producing a holding device of support structure and fixing structure can preferably comprise a plurality of just three different corrugated cardboard components (flat templates), namely comb-like segments of the support structure, approximately trapezoid flat elements as clamping wedges, and connecting elements, which can be identical for the support structure and the fixing structure.

Optionally, a kit can be provided for producing a filter module according to the invention having a filter structure body according to the invention for a filter module according to the invention for separating impurities from a raw gas stream containing impurities. The filter structure body has a support structure, wherein the support structure can be composed of components which can be taken from a pre-cut and/or pre-punched template, particularly a pre-cut and/or pre-punched template of cardboard and/or corrugated cardboard and/or fiber moldings and/or deep-drawn parts made of plastic. Likewise, a frame can be taken from a pre-punched template, particularly a pre-cut and/or pre-punched template of cardboard and/or corrugated cardboard and/or fiber moldings and/or deep-drawn parts made of plastic.

According to another aspect of the invention, a method for producing a filter structure body according to the invention comprising a support structure is proposed which is provided for a filter module according to the invention for separating impurities from a raw gas stream containing impurities.

The method comprises joining a support structure of comb-like segments and connecting elements; joining a fixing structure of fixing elements and connecting elements, inserting a filter sheet with its contact surface along the base and prongs of the support structure; fastening the filter sheet on the support structure by inserting at least one fixing structure in interstices of the inserted filter sheet.

The support structure is favorably joined in an assembly device comprising first receptacles for inserting connecting elements and, perpendicular to these, second receptacles for inserting comb-like structures.

The assembly device can also be used for joining the fixing structure.

The filter sheet can favorably be inserted and fastened in the support structure using the assembly device.

The filter structure body can be inserted in a frame using a frame assembly device, wherein the frame is moved in the frame assembly device across a contact surface and the filter structure body is inserted into the frame until it reaches the contact surface. The filter structure body is thus in the correct position inside the frame to close the frame.

It will be appreciated that a combination of coarse separator and fine filtering stage can likewise be precisely inserted into the frame.

BRIEF DESCRIPTION OF THE DRAWINGS

Other advantages can be derived from the following description of the drawings. The drawings show embodiments of the invention. The drawings, the description, and the claims contain numerous features in combination. A person skilled in the art will expediently consider these features individually and group them into useful other combinations.

Wherein, in an exemplary manner.

DETAILED DESCRIPTION

Figure 1:
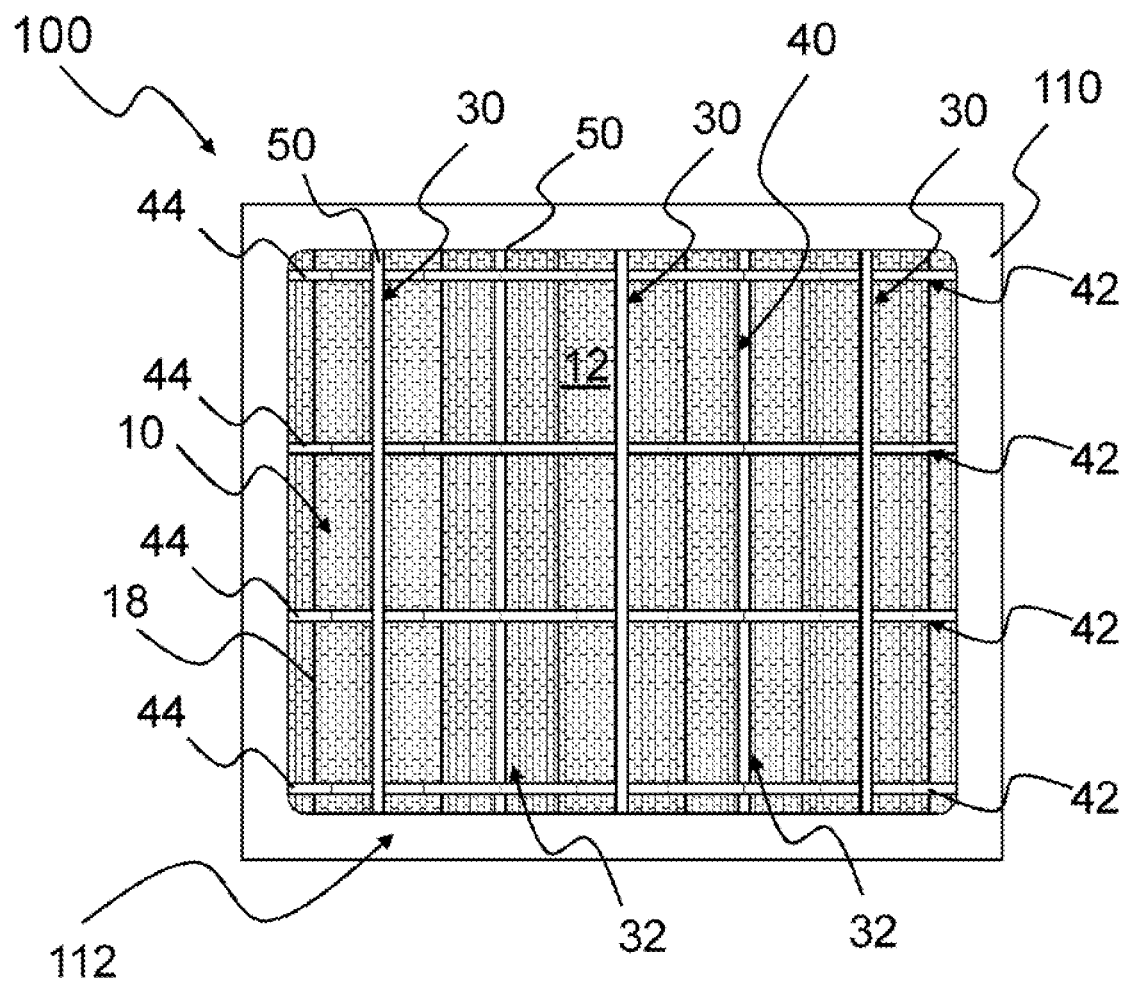
FIG. 1 shows a top view of an inflow-side opening of a filter module according to an exemplary embodiment of the invention.

Similar or similarly acting components are assigned the same reference numerals in the figures. The figures merely show examples and are not to be considered limiting.

The directional terminology used below with terms such as "left," "right," "top," "bottom," "upstream," "behind," "downstream" and the like are only intended for better understanding of the figures and in no case meant to limit the general scope. The components and elements shown, their dimensioning and use can vary in accordance with considerations of a person skilled in the art and be adjusted to the respective applications.

FIG. 1 shows a top view of an inflow-side opening 112 of a filter module 100 according to an exemplary embodiment of the invention. Raw gas flows through the inflow-side opening 112 into the filter module 100. The inflow-side opening 112 thus forms a raw gas-side opening 112.

The filter module 100 is used to separate impurities from a raw gas stream containing impurities. The filter module 100 comprises a three-dimensional filter structure body 10 through which the raw gas stream can be conducted, and an outer frame 110 for receiving the filter structure body 10 between the raw gas-side opening 112 and a clean gas-side opening, which in this embodiment is opposite the clean gas-side opening 112 and not visible. A main flow direction is directed from the raw gas-side opening 112 to the clean gas-side opening.

In the top view shown, the filter sheet 12 is disposed in a corrugated manner, with three corrugation peaks at the raw gas-side opening 112 of the filter module 100 and three corrugation valleys at the opposite end of the filter module 100.

The three-dimensional filter structure body 10 comprises a support structure 40 and a filter sheet 12 disposed thereon, which sheet comprises an inflow surface 18 through which the raw gas-side fluid enters the filter sheet 12, and an opposing outflow surface 22 (see FIG. 6) through which the filtered fluid exits from the filter sheet 12.

The support structure 40 comprises at least one, in this embodiment four, comb-like segments 42. The support structure 40 is described in detail below.

It was found that adjusting the ratio of inflow surface 18 to the raw gas-side flow cross section can have a positive effect on filter service life. The raw gas-side opening 112 upstream of the filter structure body 10 represents the raw gas-side flow cross section. The ratio of inflow surface 18 to the raw gas-side flow cross section can be advantageous depending on the properties of the impurities and/or particles to be filtered and therefore depending on the type of sprayed paint when used in a painting system and/or on the application used and/or on the prevailing air conditions.

It is therefore advantageous that, in the filter module 100 according to the invention, this ratio can be adapted as easily as possible to the properties of the particles to be separated. It is likewise advantageous that the type and number of filter sheets 12 used can be adapted as easily as possible to the properties of the particles to be separated.

Figure 2:
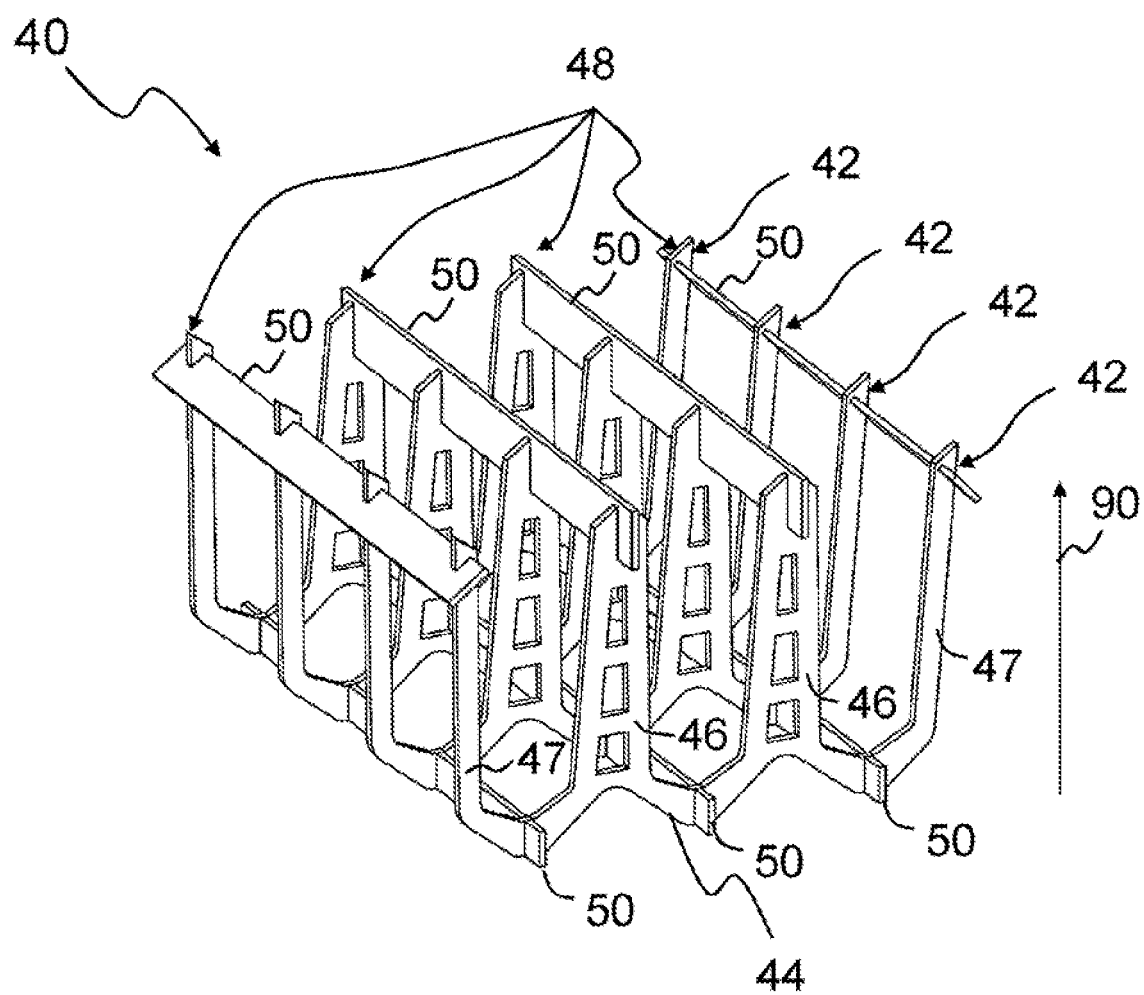
FIG. 2 shows a support structure joined of multiple parallel comb-like segments according to an exemplary embodiment of the invention.
Figure 3:
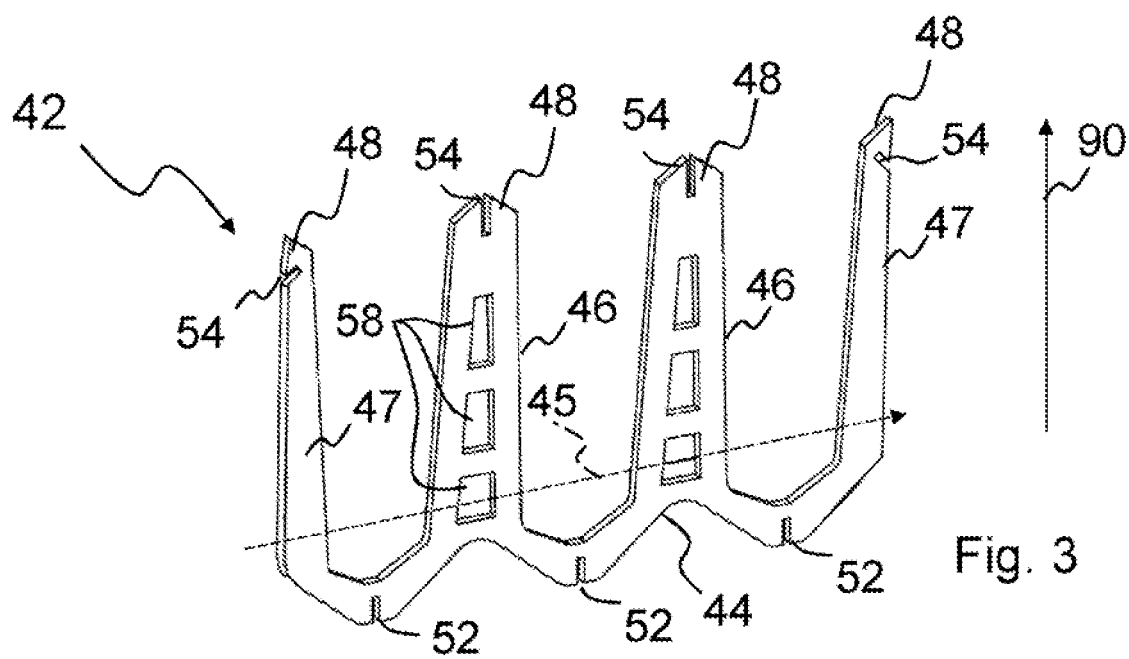
FIG. 3 shows a comb-like segment with a corrugated base of the support structure according to FIG. 2.
Figure 4:
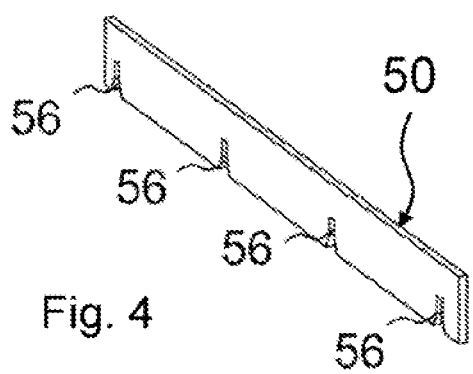
FIG. 4 shows a connecting element for connecting comb-like segments of the support structure according to FIG. 2.
Figure 5:
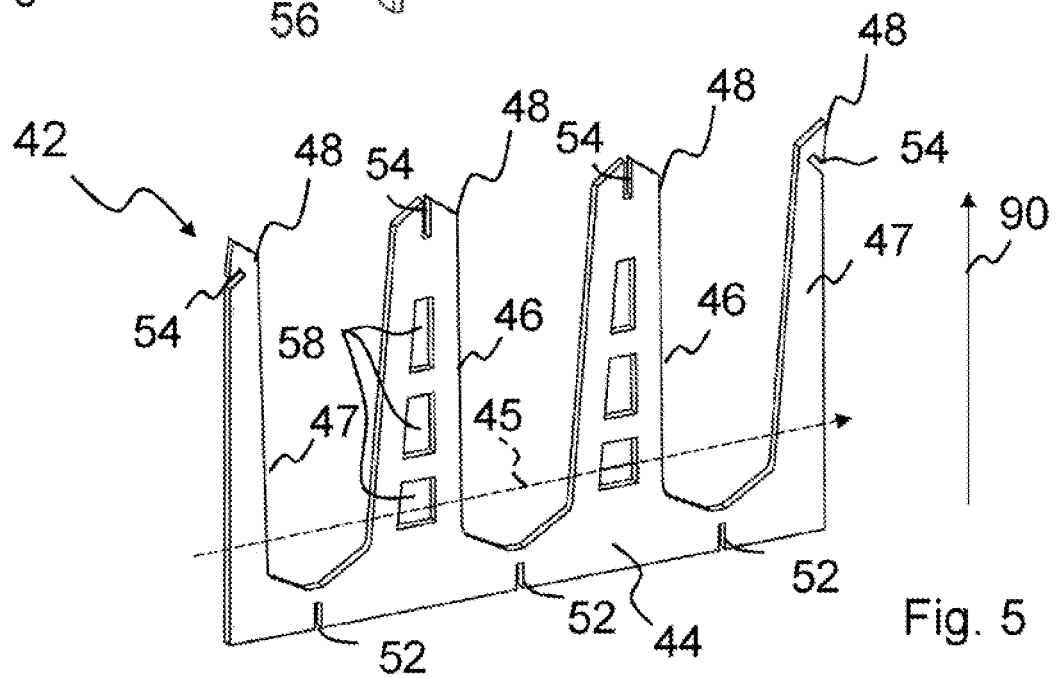
FIG. 5 shows an alternative comb-like segment having a straight base of a support structure according to an exemplary embodiment of the invention.

FIG. 2 shows a support structure 40 joined of multiple parallel comb-like segments 42 according to an exemplary embodiment of the invention. FIG. 3 shows a single comb-like segment 42 of the support structure 40, and FIG. 4 shows a single connecting element 50 of the support structure 40. FIG. 5 shows a variant of a comb-like segment 42.

The comb-like segments 42 are flat and their thickness is clearly smaller than their length or width. Their small thickness results in a very narrow, as it were, line-shaped contact surface with the filter sheet 12 (FIG. 1).

The support structure 40 is three-dimensional and includes multiple comb-like segments 42 which are disposed congruently parallel to each other and are connected at their front and back sides to connecting elements 50. The support structure 40 forms a type of three-dimensional framework for a filter sheet 12 (FIG. 1).

The connecting elements 50 are inserted in slots 52 on the outer edge of the base 44 and in slots 52 on the ends of the prongs 46, 47 remote from the base. The connecting elements 50 also comprise slots 56 for this purpose, as is visible in FIG. 4.

Each comb-like segment 42 has a continuous base 44 along a longitudinal extension 45, from which prongs 46, 47 disposed at a spacing from each other project jointly in a direction 90. The direction 90 may for example correspond to the main flow direction of the filter module 100 (FIG. 1).

The inner prongs 46 and the outer prongs 47 taper with growing distance from the base 44, such that interstices between the prongs 46, 47 are narrower at the base than at the ends 48 of the prongs 46, 47, which are remote from the base.

The inner prongs 46 have unspecified apertures along their longitudinal extension in the direction 90. If the support structure 40 is disposed on the raw gas side of the filter module 100 (FIG. 1), the apertures allow drainage of impurities separated from the fluid, such as paint particles, under the effect of gravity if the corrugations of the filter sheet 12 (FIG. 1) are oriented vertically when in operation. The outer prongs 47 have no such apertures in this example. Optionally, however, apertures can be provided here as well.

Optionally, the outer prongs 47 can have outer edges which are parallel to each other.

If the corrugations are oriented horizontally when in operation, the apertures allow a horizontal flow of the fluid in the corrugation interstice.

If the filter sheet 12 (FIG. 1) is inserted in the support structure 40, it extends in a corrugated shape along the longitudinal direction 45 of the base 44. The laying direction of the filter sheet 12 (FIG. 1) is in the longitudinal direction 45 of the base 44.

FIG. 3 shows a variant of the comb-like segment in which the outer edge of the base 44 is corrugated. If the corrugations of the filter structure body 10 are oriented vertically when in operation, this allows drainage of separated paint in the interior of the filter.

FIG. 5 shows a variant of segment 42 with a straight outer edge of the base 44.

Preferably, one respective connecting element 50 of the support structure 40 is disposed centrally in front of each corrugation peak and in each corrugation valley, such that it supports the filter sheet 12 (FIG. 1) therein linearly and parallel to the orientation of the corrugations.

In addition, connecting elements 50 may be provided on the two sides of the outer prongs 47 running parallel to the corrugations, which elements allow linear clamping of the filter sheet 12 against the respective inner side surfaces of the frame 110. This clamping is used to fasten the filter sheet 12 (FIG. 1) and to provide a seal between the filter sheet 12 and the frame 100.

Figure 6:
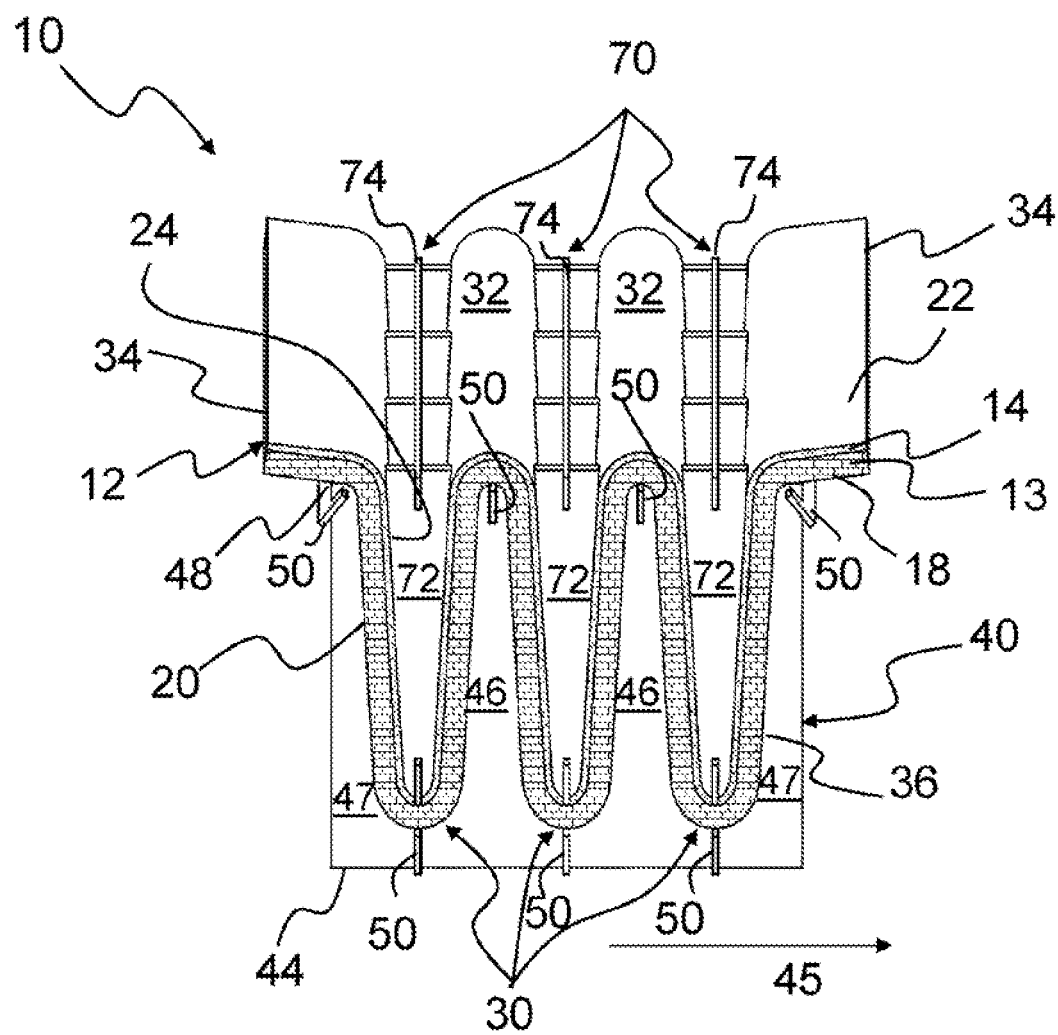
FIG. 6 shows a filter structure body with a filter sheet inserted in a support structure and fastened therein using fixing elements according to an exemplary embodiment of the invention.
Figure 7:
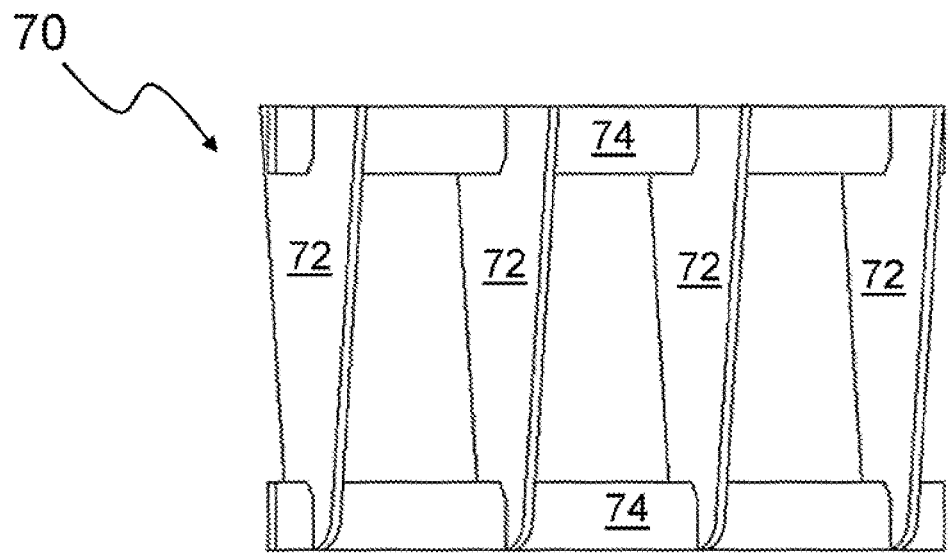
FIG. 7 shows a fixing element joined from multiple components and having a plurality of conical elements and connecting elements.
Figure 8:
FIG. 8 shows a conical element of the fixing element according to FIG. 7.
Figure 9:
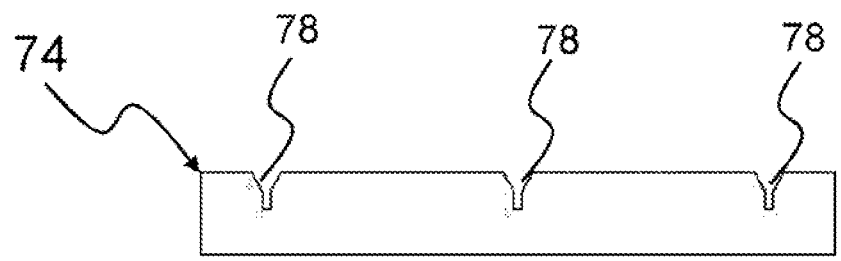
FIG. 9 shows a connecting element of the fixing element according to FIG. 7.

FIG. 6 shows a perspective view of a filter structure body 10 with a filter sheet 12 inserted in a support structure 40 and fastened therein using three fixing structures 70 according to an exemplary embodiment of the invention; FIGS. 7, 8, and 9 illustrate details of a fixing structure 70, wherein FIG. 7 shows the fixing structure 70 joined from multiple components, Figure S shows a wedge-shaped fixing element 72 of the fixing structure 70, and FIG. 9 shows a connecting element 74 of the fixing structure 70 according to FIG. 7.

Each fixing structure 70 in FIG. 6 comprises four fixing elements 72 and is preferably constructed like a framework in analogy to the frame-like support structure 40 (FIG. 2). Only the front fixing element 72 has a reference numeral in FIG. 6. The fixing structure 70 comprises congruently parallel fixing elements 72 in the form of clamping wedges, which are interconnected on the respective free ends of the fixing elements 72 by means of connecting elements 74. The connecting elements 74 have preferably equidistant cuts 78 which are inserted in cuts 76 of the connecting elements 74.

As is particularly well visible in FIG. 6, the fixing elements 72 are preferably wedge-shaped, for example as triangular or trapezoid flat elements, the shape of which matches the shape of the free cross sectional surface of the interstices of the inserted filter sheet 12, with connecting elements 50 oriented vertically to them.

The filter sheet 12 is clamped between the support structure 40 and the fixing structures 70 and extends corrugated along the longitudinal extension 45 of the base 44 of the support structure 40, wherein, viewed from the base 44, the filter sheet 12 forms corrugation peaks 30 on the base 44 and corrugation valleys 32 on the opposite side of the filter structure body 10.

The filter sheet 12 can be single-layer or formed of multiple layers placed on top of each other. FIG. 6 shows two layers, a front layer 13 through which the fluid flows first and another layer 14.

The decision on two or more layers is based on the process requirements in each individual case, wherein always a good trade-off can be sought between separation efficiency and storage capacity.

The process requirements particularly result from the properties of overspray particles to be separated, such as size distribution, rheological properties, viscosity, and surface tension, as well as overspray concentration in the raw fluid, particularly raw gas, and purity requirements to be met by the clean fluid, particularly clean gas.

Particularly the use of multi-layer paper sheets 12 of slotted lengths of paper, polyester fleece, or glass fiber material is intended for overspray separation. Other nonwoven filter materials, filter fabrics, or mats made of other filter materials such as coconut fiber can optionally be used, if required.

Particularly, materials of various coarseness can be selected for the arrangement of layers one after the other. Preferably a filter mat having a relatively low separation efficiency but a high storage volume for separated paint is used as the front layer through which the fluid flows first. Behind it, a filter mat can be disposed which offers a higher separation efficiency but typically has a lower storage volume.

One side of the filter sheet 12 represents an inflow surface 18 and the opposing side of the filter sheet 12 represents an outflow surface 22.

Inflow regions 20 of the inflow surface 18 are formed along outer edges of the prongs 46, 47 from the base 44 to ends 48 of the prongs 46, 47 that are remote from the base. Outflow regions 24 of the outflow surface 22 extend on the opposite side of the filter sheet 12, each accordingly along the outer edges of the prongs 46, 47, and are fastened with fixing elements 72. Advantageously, the outer edges fixing elements 72 abut the filter sheet 12 where the outer edges of the prongs 46, 47 abut on the inflow side 18.

The filter sheet 12 to be inserted can preferably be in one piece. Alternatively, the filter sheet 12 can be composed of multiple parts, particularly longitudinally along the base 44, which parts are inserted into the support structure 40 one after the other. In this case, care should be taken that there is sufficient overlap of the parts, such that a contiguous inflow surface 18 and/or outflow surface 22 is ensured.

The overall length of the filter sheet 12 is preferably dimensioned such that the corrugated contour in the support structure 40 can be completely covered and enough length is left on both ends that the filter sheet 12 has a protrusion 34 on both ends. The protrusion 34 can be folded over the outer prongs 47 of the support structure 40 such that it is safely clamped between the filter structure body 10 and inner walls of the frame 110 during insertion into the frame 110 (FIG. 1).

The width of the filter sheet 12 is preferably dimensioned such that it extends beyond the support structure 40 on both its longitudinal sides. This protrusion 36 (FIG. 6) can be pressed during insertion into the frame 110 against two opposing inner sides of the frame 110, such that a seal is achieved between the filter structure body 10 and the frame 110. A favorable protrusion 36 is about 1 cm to 10 cm, preferably about 5 cm.

In this way, the filter structure body 10 can be fastened in the outer frame 110 without connecting means. Particularly, the filter structure body 10 can be form-fittingly fastened in the outer frame 110.

Advantageously, the filter structure body 10 can be produced from a kit.

The kit can preferably comprise a plurality of just three different components, particularly corrugated cardboard components, as flat templates, namely comb-like segments 42 for the support structure 40 (FIGS. 2, 3, 4, 5), approximately trapezoid flat fixing elements 72 and connecting elements 50, 74 (FIGS. 7, 8, 9), which can preferably be identical for the support structure 40 and the fixing structure 70.

The kits for two preferred embodiments, Example 1 and Example 2, comprise the following components, for example:

In Example 1, the following are provided for a filter structure body 10 with a support structure 40 and a fixing structure 70 and having an exemplary inflow area of approx. 0.5 m×0.5 m and a depth of approx. 0.5 m (distance between inflow opening 112 and outflow opening): four comb-like segments 42, twelve approximately trapezoid fixing elements 72 for three fixing structures 70 with four clamping wedges each, thirteen identical connecting elements 50, 74, that is, seven for the support structure 40 and two each for the three fixing structures 70.

The connecting elements 50, 74 for the support structure 40 and the fixing structure 70 are identical.

The filter structure body 10 can advantageously be formed of corrugated cardboard and be inserted into an approximately cube-shaped outer carton as frame 110 with an edge length of approx. 0.5 m.

The filter structure body 10 is designed such that the inserted filter sheet 12 forms three whole corrugation peaks 30 (FIG. 6), such that the useful inflow area 18, which represents the useful filter area, is approximately 1.5 m2, with six corrugation flanks of 0.25 m2 each.

The kit advantageously consists of or comprises punched corrugated cardboard parts having a thickness of preferably 5 to 8 mm.

In Example 2, the following are provided for a filter structure body 10 with a support structure 40 and a fixing structure 70 and having an exemplary inflow area of approx. 0.5 m×0.5 m and a depth of approx. 0.3 m (distance between inflow opening 112 and outflow opening): three comb-like segments 42, fifteen approximately trapezoid fixing elements 72 for three fixing structures 70 with five clamping wedges each, thirteen identical connecting elements 50, 74, that is, seven for the support structure 40 and two each for the three fixing structures 70.

The connecting elements 50, 74 for the support structure 40 and the fixing structure 70 are identical.

The filter structure body 10 can advantageously be formed of corrugated cardboard and be inserted into an outer carton as frame 110 with an approximately square inflow surface and an edge length of approx. 0.5 m and a depth of approximately 0.3 m (measured in the flow direction).

The filter structure body 10 is designed such that the inserted filter sheet 12 forms three whole corrugation peaks 30, such that the useful inflow area 18 is approximately 0.9 m2, with six corrugation flanks of 0.15 m2 each.

The kit advantageously consists of or comprises punched corrugated cardboard parts having a thickness of preferably 5 to 8 mm.

In one use case, the filter structure body 10 can for example be used as coarse separator, for example with a multi-layer filter sheet of slotted paper.

The support body 40 and the fixing structure 70 are preferably formed according to Example 2. A multi-layer length of differently slotted paper is inserted as filter sheet 12 in the support structure 40. The filter sheet 12 comprises preferably five to ten (particularly eight) layers of slotted paper, wherein each two to three directly abutting layers preferably have the same slotting.

The coarse separator having this structure is used upstream of a fine filtering stage, which can preferably be structured similarly, but with a respectively finer filter sheet 12.

In another use case, the filter structure body 10 can for example be used as fine filtering stage, for example having a fine filtering mat of polyester or glass fiber material as a filter sheet. The fine filtering stage can be used as post-filter following a coarse separator, which for example operates according to the inertia principle.

The support body 40 and the fixing structure 70 are preferably formed according to Example 2. A filter fleece or a glass fiber mat is inserted as filter sheet 12 in the support structure 40. This is preferably a non-woven fabric which has honeycomb-shaped wells for increasing absorption capacity.

The fine separator structured in this way is particularly provided as second filter stage downstream of a coarse separator, which can be configured as described above, in which the filter structure body 10 comprises for example a multi-layer filter sheet 12 of slotted paper and support body 40 and fixing structure 70 are preferably formed according to Example 2.

Alternatively, a coarse separator can be provided which operates according to the inertia principle through targeted acceleration of the gas stream onto a stripping surface, wherein the flow is deflected along the stripping surface by at least 180° and then deflected back along a guiding contour by at least 180°.

In this alternative use case, the filter structure body 10 is preferably used with horizontally oriented corrugations to allow a horizontal flow in the corrugation interstices.

The fine filtering stage may, different from the design according to Example 2, also be disposed with the coarse separator in a joint outer carton as frame.

In another use case, a combined coarse and fine separator can be provided. The support structure 40 and the fixing structure 70 are advantageously formed according to Example 1, wherein a multi-layer length of differently slotted paper is inserted in the support structure 40 for coarse separation and immediately behind it a fine filtering mat of polyester fleece is inserted for fine separation.

Figure 10:
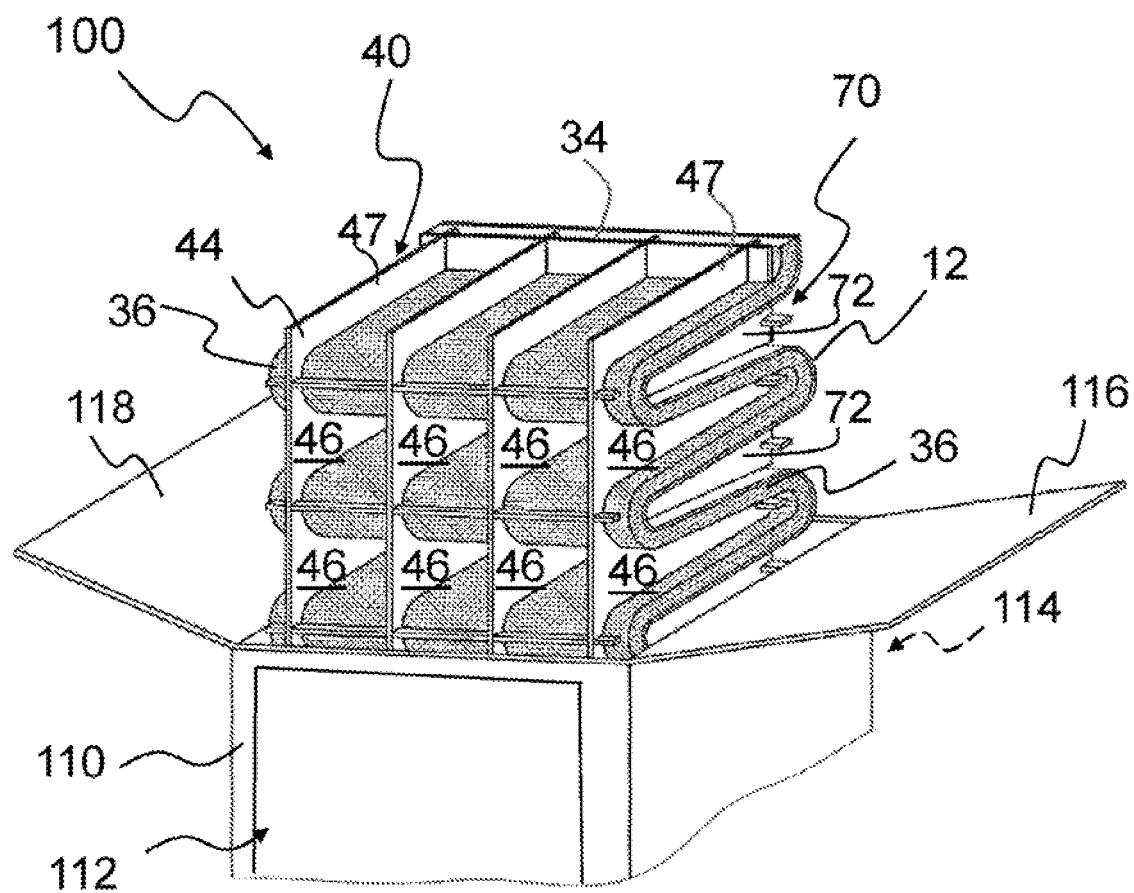
FIG. 10 shows a filter module with filter structure body and outer frame during insertion of the filter structure body into the outer frame.

An advantageous method for producing a filter structure body 10 comprises the following process flow, which is outlined in FIG. 10 in the final stage of assembly, in which a filter structure body 10 is inserted into a frame 110 which is for example configured as an outer carton. The filter structure body 10 has one protrusion 36, 34 each along the longitudinal sides and the transverse sides of the support structure 40. The filter structure body 10 is inserted through an insertion opening of the frame 110, which is exposed by flaps 116, 118 which flaps are shown as open and close the frame 110 after the installation of the filter structure body 10.

In a first step, the support structure 40 is produced by joining comb-like segments 42 and connecting elements 50.

In another step, the fixing structure 70 is produced by joining comb-like segments 72 and connecting elements 74.

In another step, the support structure 40 is provided with a corrugated negative contour facing upwards.

In another step, the filter sheet 12 is inserted into the corrugated negative contour of the support structure 40. For multi-layer filter sheets, the layer can be inserted consecutively. The filter sheet 12 is inserted such that a protrusion 34 beyond the support structure 40 remains at the start and end of the filter sheet 12.

In another step, the fixing structures 70 are inserted into the interstices of the inserted filter sheet 12.

In another step, the protrusions 34 protruding on the front and rear ends of the filter sheet 12 are folded over and the filter structure body 10 with inserted filter sheet 12 is inserted into the frame 110.

In another step, the frame 110 is closed. To this end, the flaps 116, 118 are closed.

The filter module 100 according to the invention and the filter structure body 10 according to the invention have a plurality of advantages.

The structure is extremely rigid due to the dimensionally stable support structure 40 and fixing structure 70, and even if the filter sheet 12 is loaded with a large amount of paint, the corrugated structure will not collapse or sag.

The inflow surface 18 and/or outflow surface 22 are well utilized, since the support structure 40 and fixing structure 70 only cover a linear portion and not a larger area.

Premature clogging of the inflow openings into the corrugation interstices can be prevented since the clear width of the openings is not reduced by any components disposed parallel to the corrugations. This results in improved depth loading. The inflow surfaces 18 and outflow surfaces 22 are not bulging. This results in improved flow guidance into corrugation interstices.

The support structure 40 has stripping surfaces upstream of the filter sheets 12, particularly in the form of the connecting elements 50 (FIG. 6), the base and the prongs 46, 47 of the comb-like segments 42 of the support structure 40, on which surfaces the paint can deposit without clogging the filter sheet 12.

This advantageously results in increased separation efficiency and flexibility of use. Slip within the frame 110 surrounding the at least one filter structure is reliably prevented by the peripheral clamping of the filter sheets 12 between support structure 40 and frame 110.

Any desired filter materials can be used for the single-layer or multi-layer filter sheet 12. e.g. lengths of paper, polyester fleece, fine filtering fleece, glass fiber mat. The filter module 100 can very easily be adjusted to various use cases.

Figure 11:
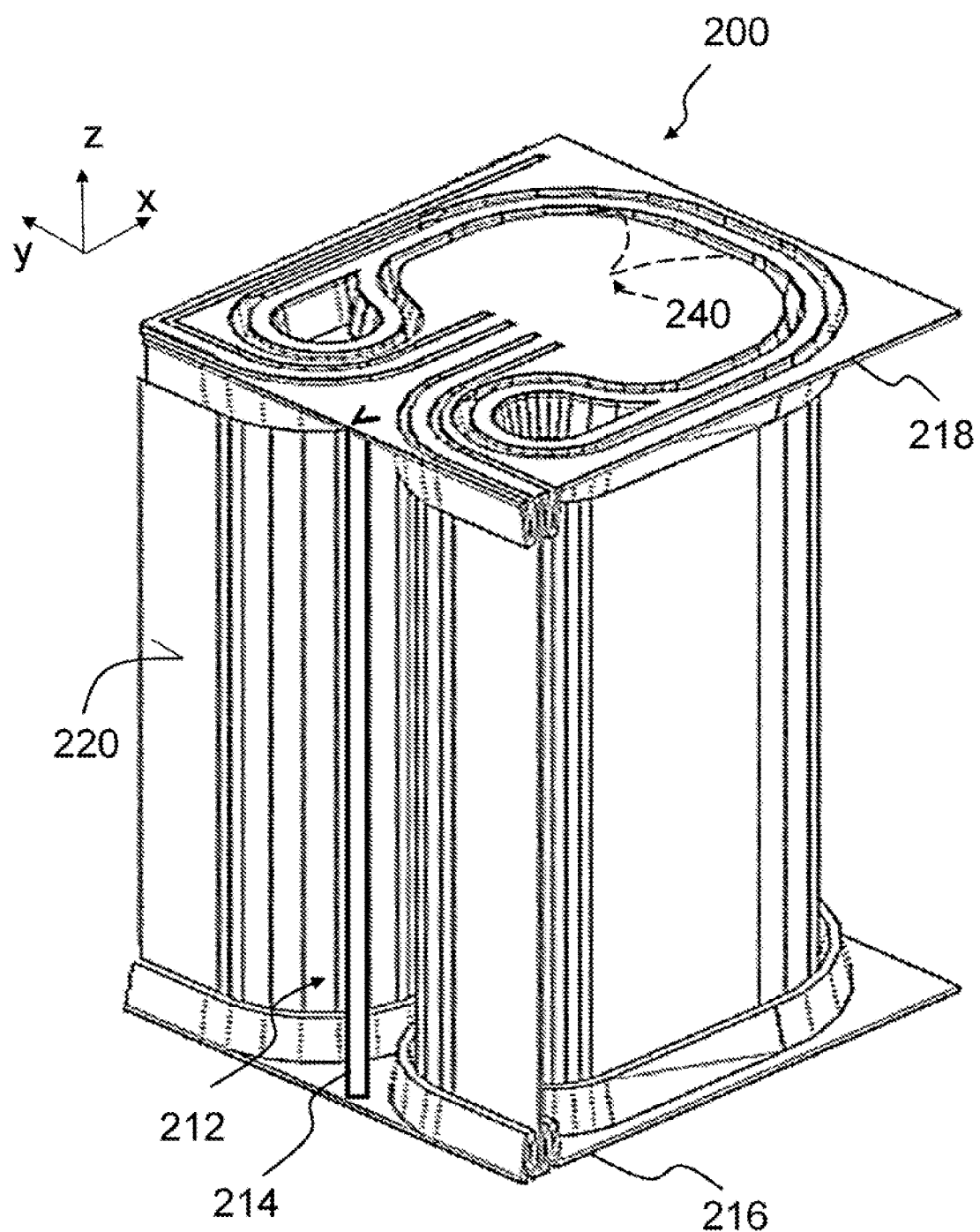
FIG. 11 shows a favorable coarse separator that operates on the inertia principle.
Figure 12:
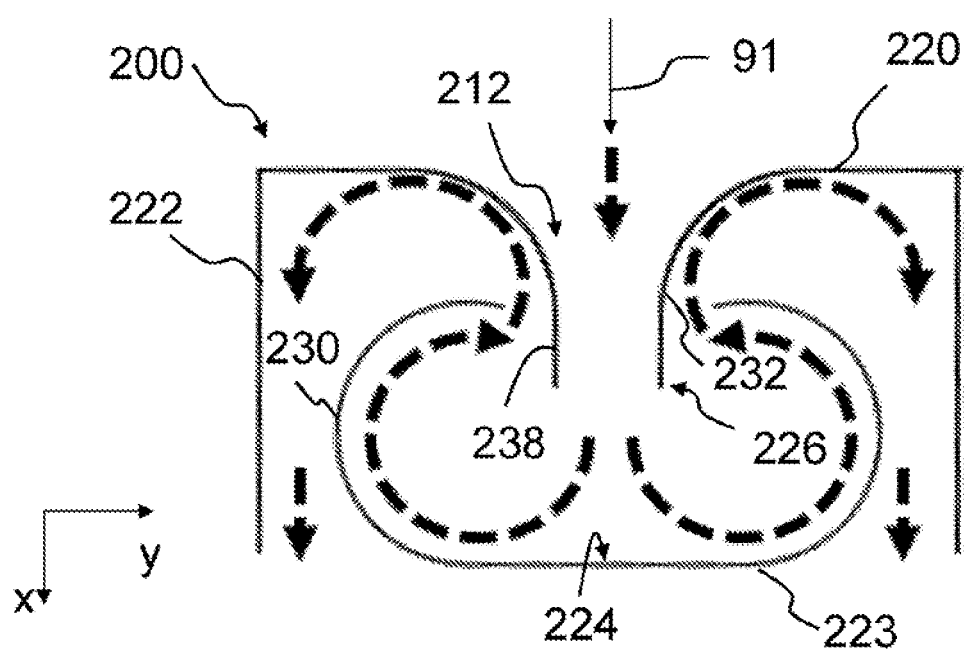
FIG. 12 shows a cross section through the coarse separator according to FIG. 11.

An advantageous coarse separator 200, which operates on the inertia principle with targeted acceleration of the gas stream onto a stripping surface, is shown in FIG. 11. FIG. 12 shows the operation based on a cross section through the coarse separator 200.

The coarse separator 200 operates according to the inertia principle through targeted acceleration of the gas stream onto a stripping surface, wherein the flow is deflected along the stripping surface by 180° and then deflected back along a guiding contour by at least 180°.

The coarse separator 200 has on its inlet side an inflow surface 220 and an acceleration section 212, for example a nozzle pointing into the depth of the coarse separator 200, followed by a first stripping surface 223 with fluid flow deflection at a first curved section 239. The inflow surface 220 forms a cross sectional area upstream of the acceleration section 212.

A coordinate cross x, y is provided for orientation. The x-axis corresponds to a longitudinal axis, which preferably is the main flow direction 91 of the acceleration section 212. The y-axis in this example corresponds to a transverse axis along which the inflow surface 220 and a free flow cross section at the entry of the fluid into the acceleration section 212 are disposed. The z-axis is directed perpendicular to the image plane and in this example corresponds to a vertical axis of the coarse separator 200. The acceleration section 212 is configured as a slot in the direction of the y-axis, which slot extends between the bottom part 216 and the cover part 218 of the coarse separator 200.

In this exemplary embodiment, the coarse separator 200 is formed by a single separating segment. Optionally, two or more separating segments can be provided next to each other, each of which comprising an acceleration section 212 and an inflow surface 220.

A person skilled in the art understands that the y-axis would form the vertical axis and the z-axis would form the transverse axis if the separating stage 100 were rotated 90° about the x-axis.

The cross sectional area of the separating segment perpendicular to a main flow direction 91 is to be considered the cross sectional area mentioned.

The main flow direction 91 is to be understood as an imaginary connection between inlet side and outlet side of the coarse separator 200. The fluid flow enters the coarse separator 200 on the inlet side and exits it again on the outlet side, which in this example is located opposite the inlet side, regardless of whether the flow reverses directions once or multiple times inside the coarse separator 200.

The inflow surface 220 transitions into the wall of the acceleration section 212. The open end 226 of the acceleration section 212 is directed at an impact area 224 of the first stripping surface 223, which is disposed at a spacing transversely thereto. The impact area is shown flat herein. Optionally, it can also have a tip 240 facing the acceleration section 212, as is indicated in FIG. 11 by a dashed line in the cover part 218 of the coarse separator 200.

A second stripping surface 238 with an opposite fluid flow deflection follows the curved section 230 of the first stripping surface 223 at another section 232 which is curved in the opposite direction. The fluid flow is indicated by straight and curved bold arrows.

The fluid, for example, a mixture of air and paint particles and paint agglomerates from a spray painting system hits the inflow surface 220 and enters the acceleration section 212 of the coarse separator 200 in a flow direction along the x-axis. It is simply neglected here that, due to the rounded course of the acceleration section 212, the portion of the fluid that hits the inflow surface 220 at the entry of the fluid into the acceleration section 212 is deflected into the acceleration section 212.

The entering fluid flow is divided symmetrically to the longitudinal direction of the acceleration section 212 transversely on both sides into two partial flows flowing in opposite directions away from each other and guided away from the end 226 of the acceleration section 212 to the outside. The section 230 of the first stripping surface 223, which section is curved at an even radius on both sides, follows the impact area 224 opposite the acceleration section 212, which area is shown flat in this example.

The end edge of the curved first section 230 is directed at the second stripping surface 232, which also has a curved section. The second stripping surface 232 is advantageously formed by the outer side of the acceleration section 212.

The entering fluid is accelerated in the acceleration section 212 and, after the impact area 224 on the left side of the figure deflected clockwise in accordance with the curvature of the curved section 230 and is deflected counterclockwise on the opposite right side. The deflection is at least 45°, preferably more than 180°, here 270°, relative to the flow direction. Deflection by more than 180° increases the likelihood of a wall contact for the particles of the fluid flow, which increases the separation efficiency.

The fluid flow is further deflected at the second stripping surface 238, the inlet section of which is disposed transversely to the curved section 230. The curved section of the second stripping surface 238 is curved in the opposite direction of the first curved section 230 of the first stripping surface 223. The fluid flow is deflected further there, on the left side counterclockwise and on the right side clockwise, such that the fluid flow flows against the original flow direction in the acceleration section 212 at the start of the stripping surface and is finally further deflected towards the x-axis at a limiting wall 222. The two partial flows leave the coarse separator 200 in the original flow direction 91.

Particles from the fluid can easily deposit on the curved sections 230, 232 due to the deflection and the centrifugal forces prevailing at the curved sections 230, 232. Particles which after the first deflection at the first stripping surface 223 are remote from the same in the fluid flow will inevitably get into the vicinity of the second stripping surface 238 during the second deflection at the second stripping surface 238 and can easily deposit thereon and thus be removed from the fluid flow.

Upstream of the slot-like acceleration section 212, the coarse separator comprises a guiding element 214, which may be detachable. The guiding element 214 extends in a symmetry plane of the free flow cross section at the entry of the fluid into the acceleration section 212 from the bottom part 216 to the cover part 218 along the vertical axis z. The guiding element 214 in this example extends parallel to the z-axis.

The guiding element 214 is in this example tapered against the flow direction, having a V-shaped cross section, for example. The guiding element 214 can be used to minimize noise of the fluid flow through the coarse separator 200. The guiding element 214 can influence the flow such that noise generation can be reduced or largely suppressed.

By means of suitable positioning and/or shaping, the guiding element 214 can cause swirling of the inflowing fluid, for example inflowing air, and/or cause a reflection of the noise occurring downstream of the acceleration section 212.

The coarse separator 200 can also be completely made of punched parts, which can be transported in compact form and assembled into the coarse separator 200 at the site of use only.

Figure 13:
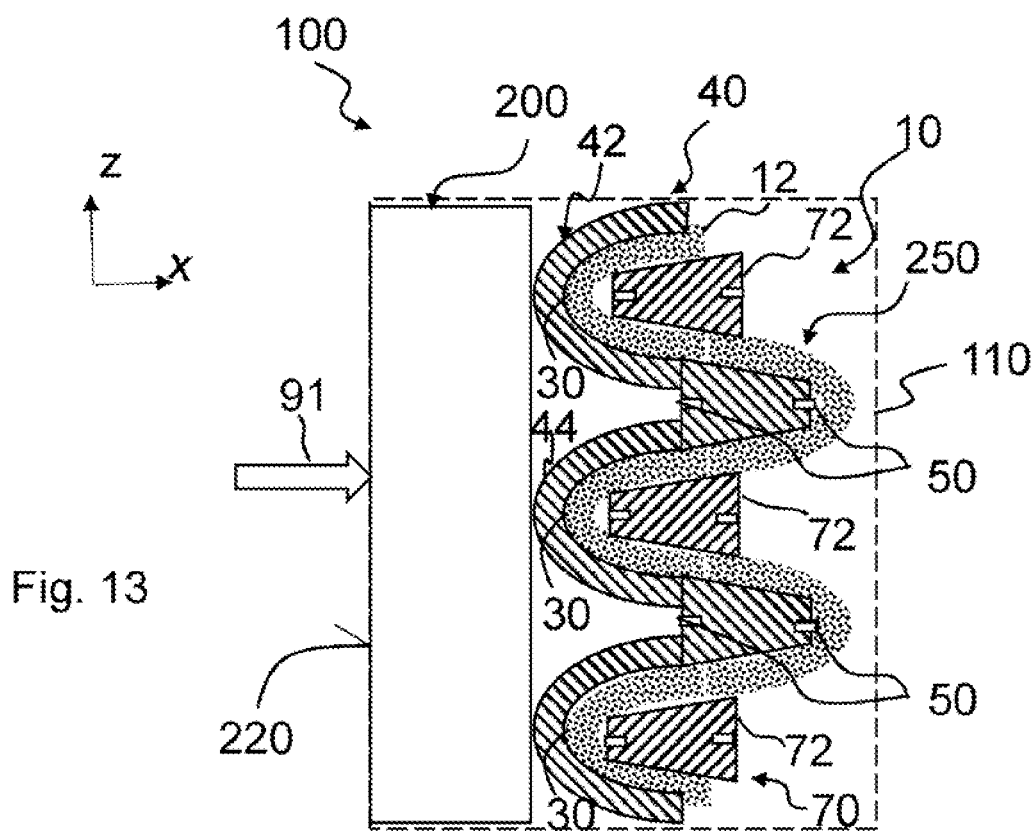
FIG. 13 schematically shows a connection in series of coarse separator and fine filtering stage.

An exemplary embodiment of a filter module 100 combined with a coarse separator 200 according to FIG. 11 with a downstream fine filtering stage 250 is shown in FIG. 13 in which the frame 110 is only outlined.

The filter structure body 10 is used as fine filtering stage 250 with a filter sheet 12, for example a fine filtering mat made of polyester fleece or glass fiber material or the like, downstream of the coarse separator 200.

The filter structure body 10 is disposed immediately downstream of the coarse separator 200 and may be disposed in a joint frame 110, for example an outer carton. The comb-like segments 42 of the support structure 40 are used at the same time for support against the structure of the coarse separator 200. The support 40 rests with the base 44 of the comb-like segments 42 on the outlet side of the coarse separator 200.

The filter structure body 10 is preferably used with horizontally oriented corrugations of the filter sheet 12, that is, parallel to the direction of the y-axis, which in the figure extends vertically to the drawing plane. This orientation of the corrugations allows a horizontal flow in the corrugation interstices of the filter sheet 12. This means that the corrugations of the filter sheet 12 run across, particularly perpendicular to, the slot-like extension of the acceleration section 212 of the coarse separator 200 (FIG. 11).

If the coarse separator 200 were tilted about the x axis, for example, it would be advantageous to maintain the relative orientation of the corrugations of the filter sheet 12 of the fine filtering stage 250 transversely to the extension of the acceleration section 212.

The filter structure body 10 is preferably dimensioned such that the fine filtering stage 250 is saturated, if possible, at the same rate as the coarse separator 200. Specifically, a coarse separator 200 that is approx. 300 mm deep can be combined with a filter structure body 10 that is approx. 200 mm deep and has a filtering area of approx. 0.7 m2. Both can be disposed in a joint outer carton as frame 110 that is 500 mm deep.

Figure 14:
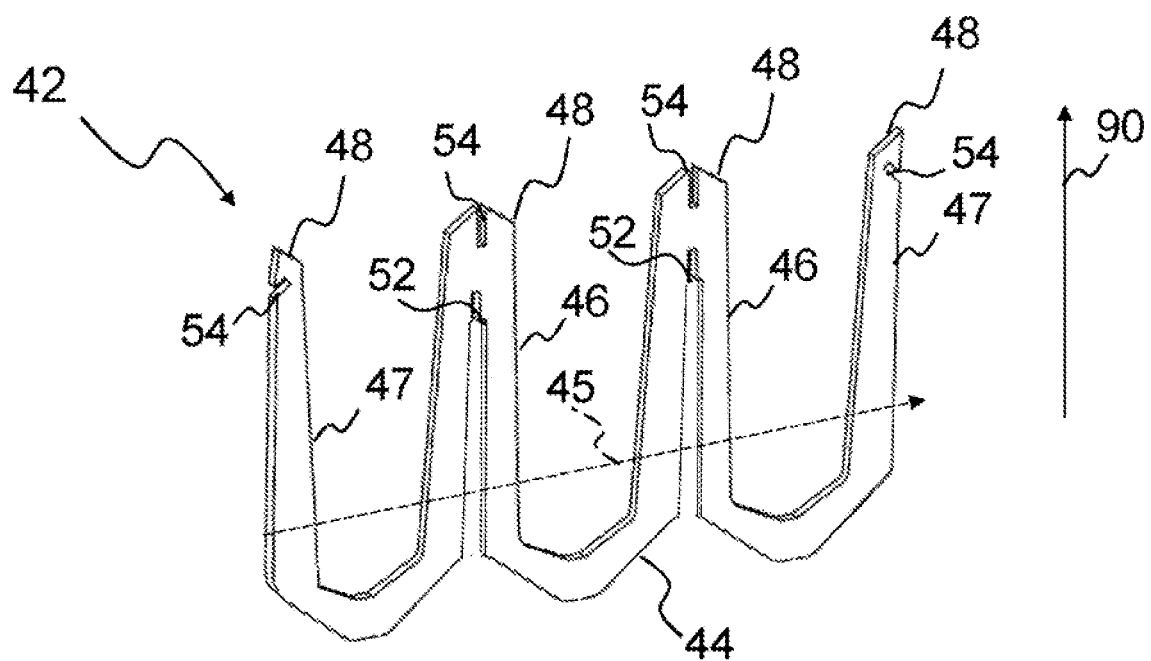
FIG. 14 shows a comb-like segment for a fine filtering stage.

Unlike the exemplary embodiment in FIG. 1, there are no connecting elements 50 disposed at the support structure 40 in front of the corrugation peaks 30 to facilitate as small a distance as possible to the coarse separator 200 (FIG. 11). Instead, the connecting elements 50 are disposed between the comb-like segment 42 in the corrugation valleys, as can be seen at the comb-like segment 42 in FIG. 14. This is possible in this case, since the pre-filtration in the coarse separator 200 prevents the risk of premature clogging of the corrugation valleys due to excessive paint deposits on the connecting elements 50.

The support structure 40 and the fixing structure 70 are formed in analogy to Example 2. Particularly, the support structure 40 can be shaped such that the inserted filter sheet 12, e.g. a filtering mat, forms three whole corrugation peaks 30. The size of the inflow surface is approx. 0.5 m×0.5 m, and the support structure 40 comprises three comb-like segments 42.

In addition to the comb-like segments 42, the support structure 40 may comprise wedge-shaped, approximately trapezoid stiffening elements which are not shown separately and are disposed centrally between two comb-like segments 42 in the corrugation valley, viewed in the direction of the y-axis. These are used for additional support of the filter sheet 12, e.g. a filtering mat, if the corrugations are oriented horizontally and prevent "sagging" of these corrugations under an increasing paint load. The advantage of using these stiffening elements instead of additional comb-like segments 42 is that the stiffening elements are a lesser obstruction to a horizontal flow in the corrugation interstices.

Preferably, the depth of the filter structure body 10 relative to the distance between the raw-side opening 112 and the clean-side opening 114 of the frame 110 (FIG. 10) is dimensioned such that the fine filtering stage 250 with the filter structure body 10 occupies only half the section. The depth of the filter structure body 10, viewed in the direction of the x-axis, is only 200 mm, for example.

The series connection shown of coarse separator 200 and fine filtering stage 250 filter sheets 12 facilitates combining high storage capacity with good fine separation, i.e., high separation efficiency.

An advantageous kit of punched corrugated cardboard parts for the support structure 40 favorably comprises four additional, approximately trapezoid, stiffening elements per every three comb-like segments 42.

Alternatively, the advantage of high separation efficiency can be achieved in that (only) one filter sheet 12 from a fine filtering mat is used which has a three-dimensional surface on the inflow side to increase its storage volume. In this manner, a larger surface for depositing the separated paint is available, and the filter sheet 12 will not clog that fast. This variant can pose other advantages, such as lower material costs, less assembly effort for the filter module because only one filter sheet must be inserted, increased separation efficiency and storage capacity in specific applications, particularly if paint particles are relatively dry.

Figure 15:
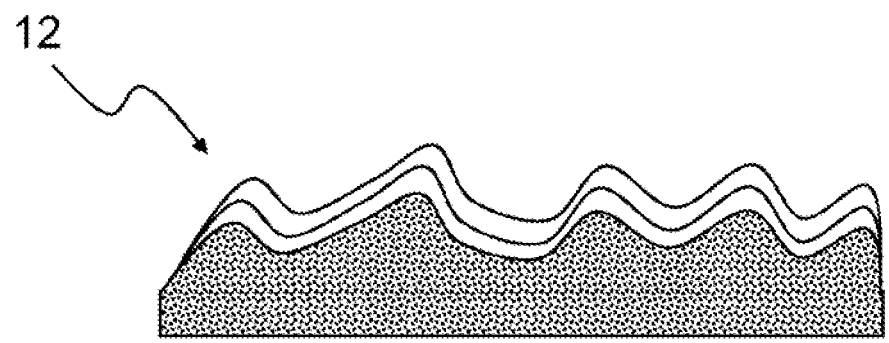
FIG. 15 shows a side view of a filter sheet having a corrugated surface.
Figure 16:
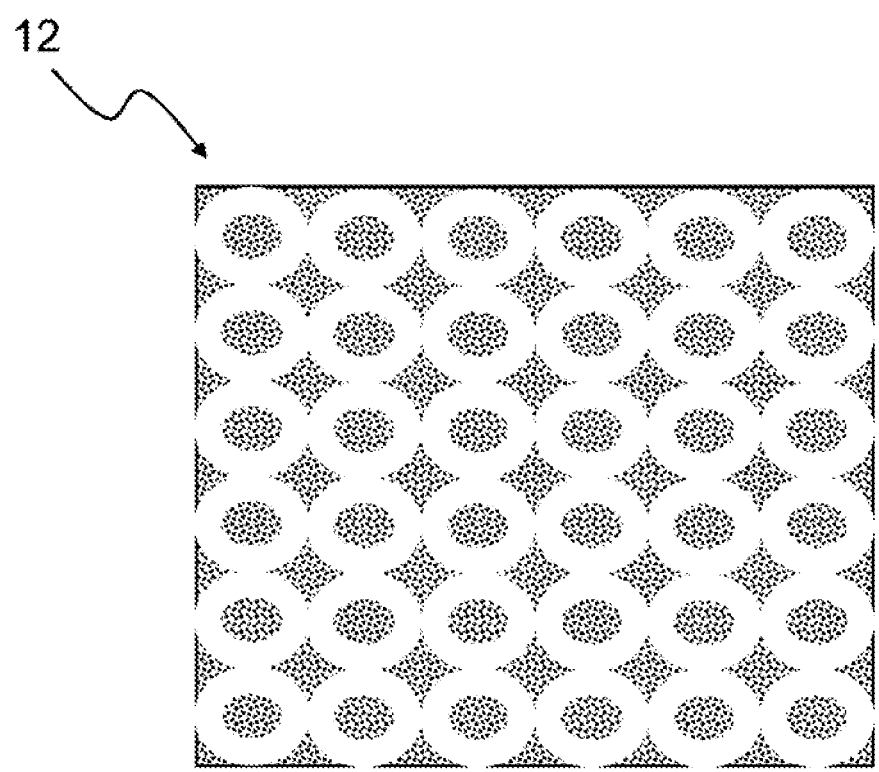
FIG. 16 shows a top view of a filter sheet having a mesh-like structure on its surface.

FIGS. 15 and 16 show favorable filter sheets 12 with a three-dimensionally structured surface, which can be designed in the form of filtering mats.

FIG. 15 shows a side view of the filter sheet 12, which has a corrugated, three-dimensional structure on at least one surface. This increases the surface area of the filter sheet 12. FIG. 16 shows a top view of a filter sheet 12, the surface of which has a mesh-like or honeycomb-like structure.

The three-dimensional surface structure of the filter sheet 12 can be produced in different ways. For example, the filter sheet 12 can have different material thicknesses, such that a corrugated surface with high and low points is created (FIG. 15).

Alternatively, the filter sheet (FIG. 16) can be constructed of two connected layers, wherein the upper (raw gas-side) layer has a mesh-like structure and comprises openings ("holes"), such that the surface of the filter sheet 12 has respective wells. The openings in the upper layer can for example be produced by cuts in a longitudinal direction of this layer and stretching the layer in the orthogonal longitudinal direction. This creates honeycomb-like openings or wells in the filter sheet 12. The two layers can be made of the same filter fleece or of different filter materials, which may differ in their fiber diameters or other material properties, for example. The upper layer is preferably somewhat coarser than the lower layer.

Both variants of the filter sheet 12 can on the one hand be used for a fine filtering stage in combination with an upstream coarse separator 200 like in FIG. 13.

On the other hand, such filter sheets 12 can also be considered as the sole separator, due to the combination of high storage capacity and high separation efficiency.

Optionally, several three-dimensionally structured layers according to FIGS. 15 and/or 16 can be combined into one filter sheet 12, and the individual layers do not need to be connected. Of these two or more layers, at least the raw gas-side layer has a three-dimensionally structured surface, particularly with openings. But it is also possible to use multiple layers with openings one after the other.

FIGS. 17 to 21 show assembly devices 300, 310 for assembling the filter structure body 40 and the filter module 100.

Figure 17:
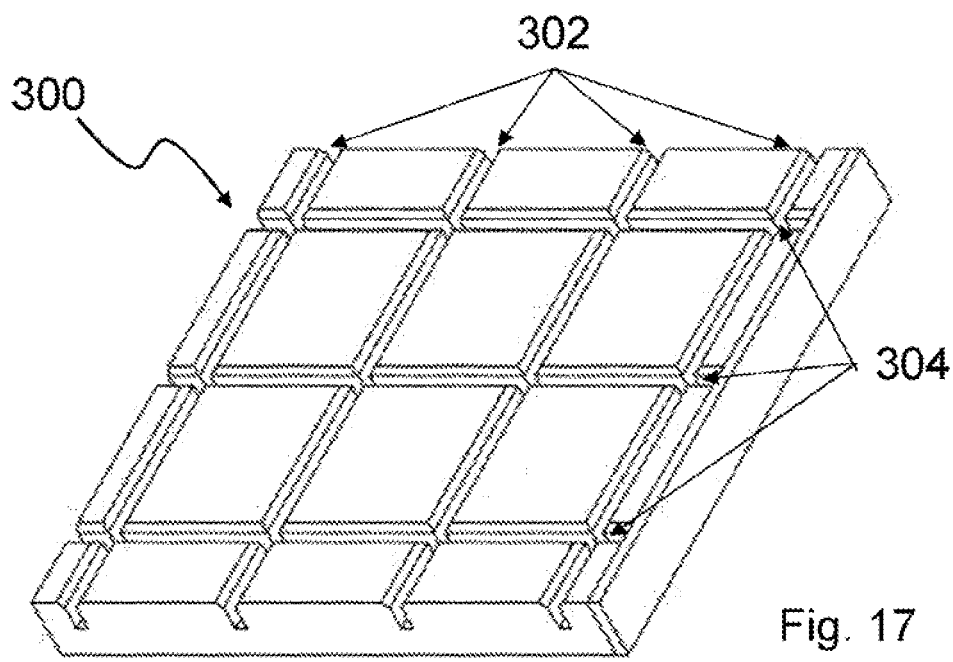
FIG. 17 shows an assembly device for building the support structure and the fixing structure of a filter structure body according to the invention.
Figure 18:
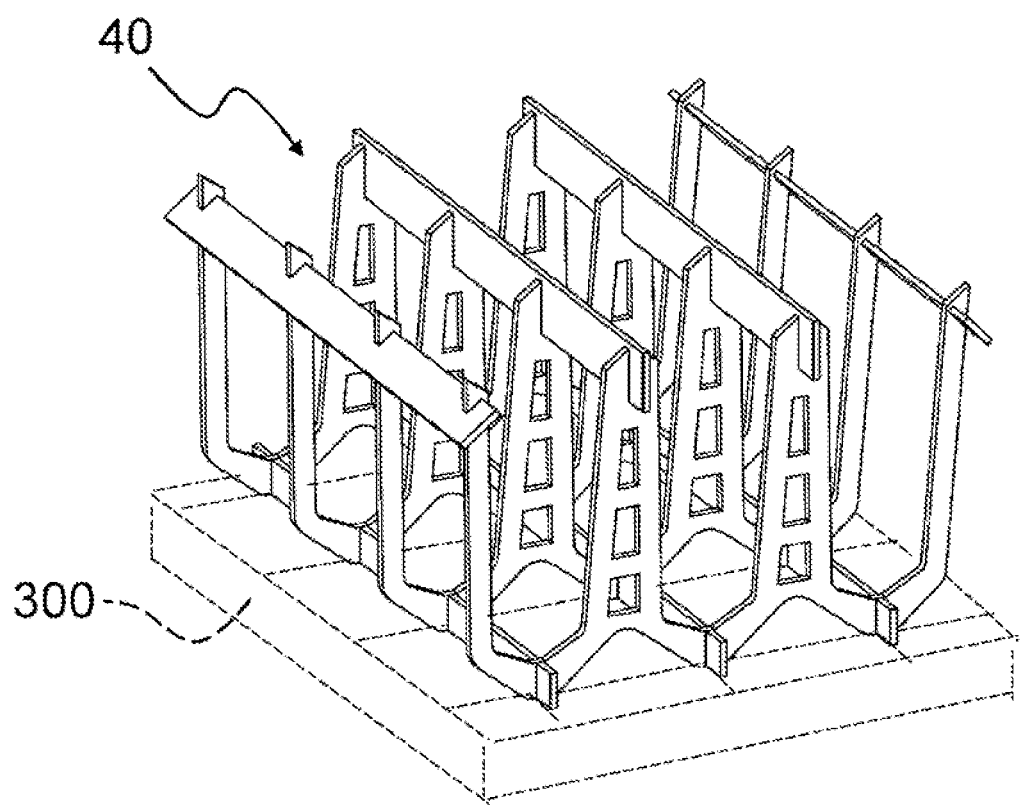
FIG. 18 schematically shows a support structure installed in an assembly device according to FIG. 17.

FIG. 17 shows an assembly device 300 for building a support structure 40 and fixing structure 70 of a filter structure body according to the invention and FIG. 18 schematically shows a support structure 40 mounted in the assembly device 300 according to FIG. 17.

The parts of the support structure 40 can be inserted in the assembly device 300 to hold them in position. A plate having intersecting grooves 302, 304 extending perpendicular to each other can for example be used as assembly device 300.

Figure 19:
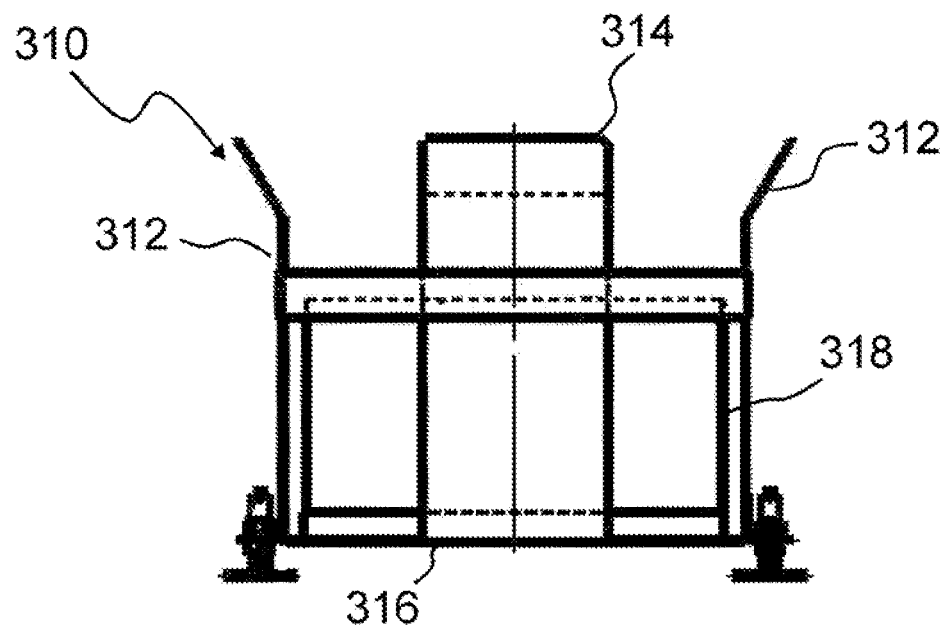
FIG. 19 shows a side view of an assembly device for installing a filter structure body in a frame designed as an outer carton.
Figure 20:
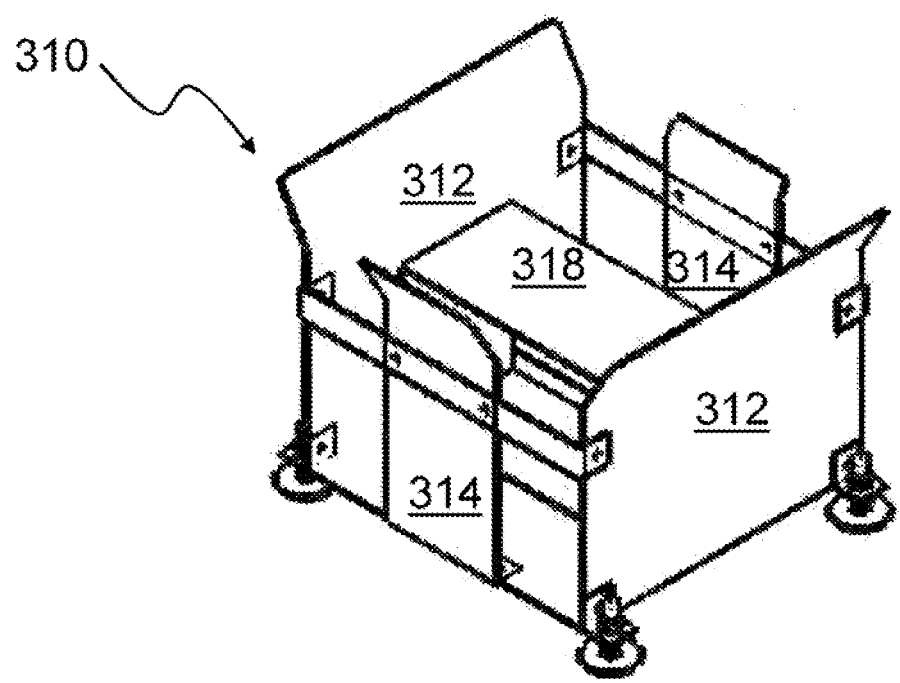
FIG. 20 shows a perspective view of the assembly device for installing a filter structure body according to FIG. 19.
Figure 21:
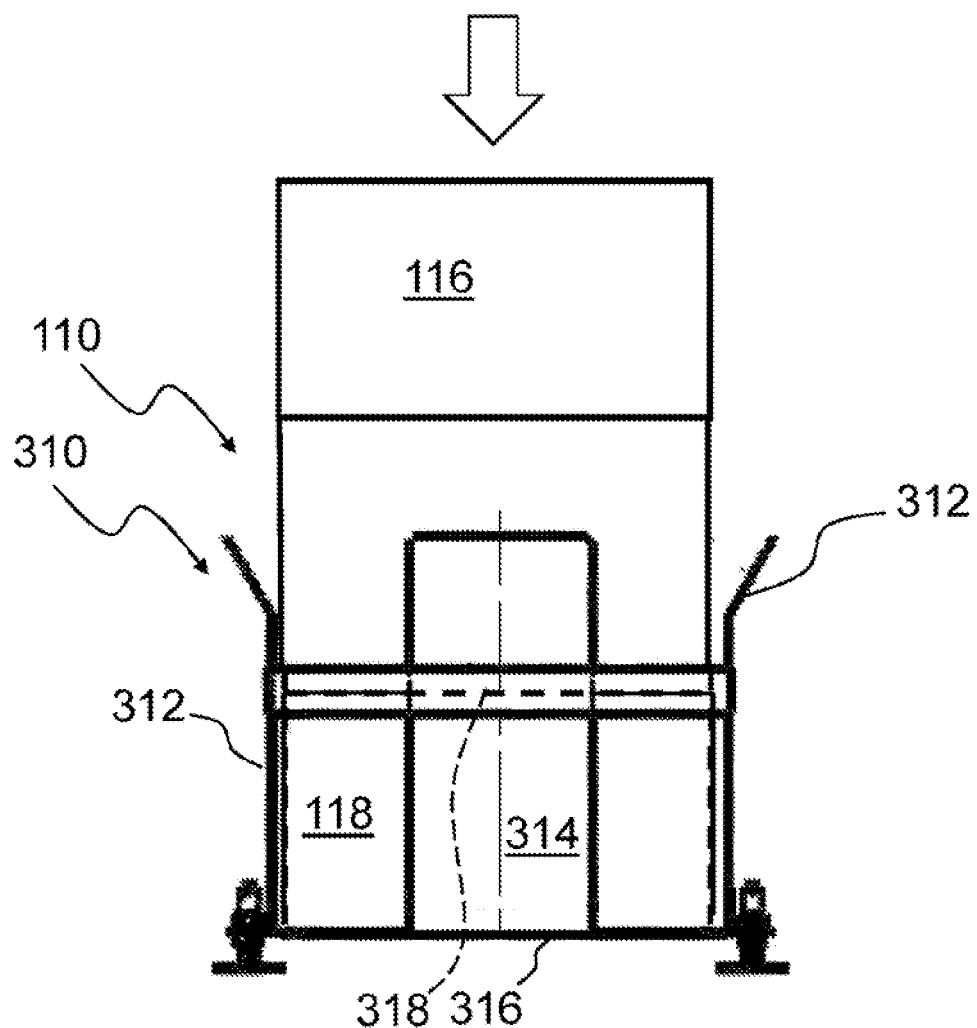
FIG. 21 shows a side view of the assembly device according to FIG. 19 with an inserted outer carton.

FIGS. 19 to 21 show an assembly device 310 for installing a filter structure body in a frame 110, which may for example be designed as an outer carton.

FIG. 19 shows a side view of the assembly device 310, FIG. 20 shows a perspective view of the assembly device 302, and FIG. 21 shows a side view of the assembly device 310 with a frame 110 in the form of an outer carton inserted therein, said frame having opened upper and lower flaps 116, 118.

The assembly device 310 has four side walls 312, 314, which are outwardly angled on their free ends. Two opposing side walls 312 occupy the entire width of the assembly device 310, while the two other opposing side walls 314 have a smaller width. A table-like contact surface 318 is disposed on the bottom 316 of the assembly device (FIGS. 19, 20) within the side walls 312, 314.

The table-like contact surface 318 is at a spacing to the side walls 312, 314, such that an outer carton (frame 110) with open flaps 118 can be moved over the contact surface. The flaps 118 contact the bottom 216. The height of the contact surface 318 is dimensioned such that the filter structure body 10 (FIG. 10) or the coarse separator 200 with fine filtering stage 250 can be inserted into the frame 110 and, when resting on the contact surface 318, are in the correct position in relation to the frame 110, such that the flaps 116, 118 can be closed.

The raw-side and the clean-side openings 112, 114 (FIG. 10) in the frame 110 are in this condition expediently still closed and can particularly be characterized by a perforation which can simply be broken open for using the filter module.

Figure 22:
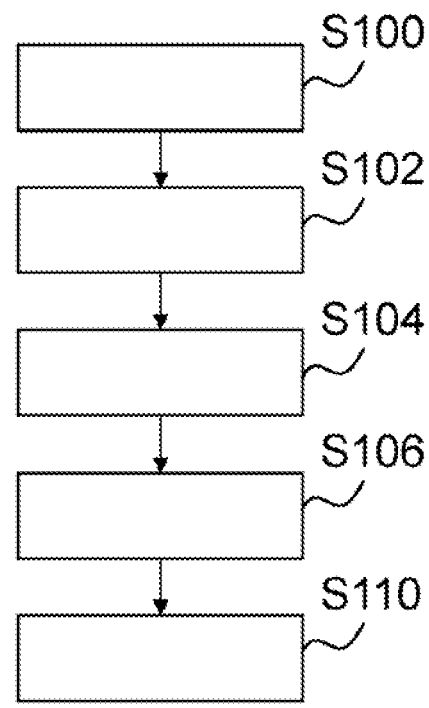
FIG. 22 shows a flow chart of a favorable method of building a filter module.

FIG. 22 shows a flow chart of a favorable method of building a filter module.

In step S100, a support structure 40 is joined together from comb-like segments 42 and connecting elements 50.

In step S102, a fixing structure 70 is joined together from fixing elements 72 and connecting elements 74.

The support structure 40 can be joined in an assembly device 300 in step S100 (FIG. 16) which comprises first receptacles 302 for inserting connecting elements 50 and second receptacles 304 extending perpendicular to the first ones for inserting comb-like segments 42.

In step S104, a filter sheet 12 is inserted in a corrugated manner into the support structure 40 with its contact surface along the base 44 and prongs 46, 47 of the support structure 40.

In step S106, the filter sheet 12 is fastened on the support structure 40 by inserting at least one fixing structure 70 into the interstices of the inserted filter sheet 12.

Inserting the filter sheet 12 into the support structure 40 in step S104 and fastening the filter sheet 12 in the support structure 40 in step S106 can advantageously be performed in the assembly device 300.

The filter structure body 40 is inserted into a frame 110 in step S110. This insertion can be performed using a frame assembly device 310, wherein the frame 110 is moved in the frame assembly device 310 across a contact surface 316 and the filter structure body 40 is inserted into the frame 110 until it reaches the contact surface 316.

REFERENCE NUMERALS 10 filter structure body
12 filter sheet
13 first layer
14 second layer
18 inflow surface
20 inflow region
22 outflow surface
24 outflow region
30 corrugation peak
32 corrugation valley
34 protrusion
36 protrusion
40 support structure
42 comb-like segment
44 base
45 longitudinal direction
46 prong
47 prong
48 end remote from the base
50 connecting element
52 receptacle
54 receptacle
56 receptacle
58 aperture
70 fixing structure
72 fixing element
74 connecting element
76 receptacle
78 receptacle
80 stiffening element
90 direction
91 main flow direction
100 filter module
110 frame
112 raw-side opening
114 clean-side opening
116 flap
118 flap
200 coarse separator
212 acceleration section
214 guiding element
216 bottom part
218 cover part
220 inflow surface
222 limiting wall
223 first stripping surface
224 impact area
226 end of acceleration section
238 second stripping surface
230 first curved section
232 oppositely curved section
240 tip
250 fine filtering stage
300 assembly device
302 slot
304 slot
310 assembly device
312 side wall
314 side wall
316 contact surface
318 bottom

The invention claimed is:

1. A filter module for separating impurities from a raw gas stream containing impurities, comprising
   at least one three-dimensional filter structure body through which the raw gas stream can be conducted, and
   an outer frame for receiving the filter structure body between the raw gas-side opening and a clean gas-side opening,
   wherein the at least one three-dimensional filter structure body comprises a support structure and a filter sheet disposed thereon, which comprises an inflow surface and an outflow surface,
   wherein the support structure comprises a plurality of comb-like shaped segments, each with a base, from which prongs project jointly in a direction at a spacing from each other in the longitudinal direction of the base,
   wherein the plurality of comb-like shaped segments are arranged congruently parallel to one another and are connected by a plurality of discrete connecting elements connecting the comb-like shaped elements segments and attached to the comb-like shaped elements segments at peaks of the prongs of the comb-like shaped elements segments,
   wherein a laying direction of the filter sheet extends in the longitudinal direction of the base, and wherein inflow regions of the inflow surface are disposed on one side of the filter sheet and outflow regions of the outflow surface are disposed on the opposite side of the filter sheet, each of which extending along the prongs between the base and ends of the prongs remote from the base.

2. The filter module according to claim 1, wherein the filter sheet is fastened in the support structure using at least one fixing structure comprising at least one fixing element.

3. The filter module according to claim 1, wherein the base is configured in one piece.

4. The filter module according to claim 1, wherein the prongs taper in a direction away from the base.

5. The filter module according to claim 1, wherein the filter sheet comprises one or several filtering mats.

6. The filter module according to claim 1, wherein the filter structure body is fastened in the outer frame without connecting means, particularly wherein the filter structure body is form-fittingly fastened in the outer frame.

7. The filter module according to claim 1, wherein the filter sheet is laid out in a corrugated manner along the base of the at least one segment of the support structure, particularly wherein a protrusion beyond the support structure is provided at the start and end of the filter sheet.

8. The filter module according to claim 1, wherein a coarse separator followed by a fine filtering stage is disposed in the frame, particularly wherein the coarse separator for inertial separation of components contained in a fluid flowing through it, particularly paint particles and/or paint agglomerates, particularly wherein the coarse separator comprises at least one acceleration section for the fluid on its inlet side in which the fluid is accelerated in a flow direction and a first stripping surface for components contained in the fluid is disposed downstream of the acceleration section.

9. The filter module according to claim 1, wherein an extension of the acceleration section between bottom part and cover part of the coarse separator is oriented transversely, particularly perpendicular, to corrugations of the filter sheet of the fine filtering stage.

10. The filter module according to claim 1, wherein discrete connecting elements are attached to the comb-like shaped segments at troughs between the prongs of the comb-like shaped segments.

11. A filter module for separating impurities from a raw gas stream containing impurities, comprising at least one three-dimensional filter structure body through which the raw gas stream can be conducted, and an outer frame for receiving the filter structure body between the raw gas-side opening and a clean gas-side opening, wherein the at least one three-dimensional filter structure body comprises a support structure and a filter sheet disposed thereon, which comprises an inflow surface and an outflow surface, wherein the support structure comprises a plurality of comb-like shaped segments, each with a base, from which prongs project jointly in a direction at a spacing from each other in the longitudinal direction of the base, wherein the plurality of comb-like shaped segments are arranged congruently parallel to one another and are connected by a plurality of discrete connecting elements connecting the comb-like shaped elements segments and attached to the comb-like shaped segments at troughs between the prongs of the comb-like shaped segments, wherein a laying direction of the filter sheet extends in the longitudinal direction of the base, and wherein inflow regions of the inflow surface are disposed on one side of the filter sheet and outflow regions of the outflow surface are disposed on the opposite side of the filter sheet, each of which extending along the prongs between the base and ends of the prongs remote from the base.

\* \* \* \* \*